(12) United States Patent
Nam et al.

(10) Patent No.: US 8,437,300 B2
(45) Date of Patent: May 7, 2013

(54) METHOD AND SYSTEM OF MULTI-LAYER BEAMFORMING

(75) Inventors: Young-Han Nam, Richardson, TX (US); Jianzhong Zhang, Irving, TX (US)

(73) Assignee: Samsung Electronics Co., Ltd, Suwon-si (KR)

( * ) Notice: Subject to any disclaimer, the term of this patent is extended or adjusted under 35 U.S.C. 154(b) by 395 days.

(21) Appl. No.: 12/899,331

(22) Filed: Oct. 6, 2010

(65) Prior Publication Data

US 2011/0085503 A1 Apr. 14, 2011

Related U.S. Application Data

(60) Provisional application No. 61/250,782, filed on Oct. 12, 2009, provisional application No. 61/278,835, filed on Oct. 13, 2009.

(51) Int. Cl.
*H04W 4/00* (2009.01)

(52) U.S. Cl.
USPC .......................................... 370/329

(58) Field of Classification Search ........................ None
See application file for complete search history.

(56) References Cited

U.S. PATENT DOCUMENTS

| | | | |
|---|---|---|---|
| 2007/0037519 A1 | 2/2007 | Kim et al. | |
| 2007/0253465 A1 | 11/2007 | Muharemovic et al. | |
| 2008/0232308 A1 | 9/2008 | Dehner et al. | |
| 2009/0247228 A1 | 10/2009 | Yellin | |
| 2009/0268910 A1* | 10/2009 | Liu et al. | 380/268 |

OTHER PUBLICATIONS

International Search Report dated Jun. 24, 2011 in connection with International Application No. PCT/KR2010/006987.
Written Opinion of the International Searching Authority dated Jun. 24, 2011 in connection with International Application No. PCT/KR2010/006987.

* cited by examiner

*Primary Examiner* — John Blanton

(57) ABSTRACT

A base station includes a reference signal sequence generator configured to generate a reference signal sequence for a reference signal for each of n antenna ports using one initialization seed $c_{init}$ with n being a positive integer. The initialization seed is defined as:

$$c_{init} = (\lfloor n_s/2 \rfloor + 1) \cdot (2N_{ID}^{cell} + 1) \cdot 2^{16} + N_{ID}^{group},$$

where $n_s$ is a first slot number in a subframe, $N_{ID}^{cell}$ is a cell identifier of the base station, and $N_{ID}^{group}$ is a group identifier. The base station also includes a transmit path circuitry configured to transmit a downlink grant and the reference signal. In some embodiments, the group identifier $N_{ID}^{group}$ is a one-bit group identifier dynamically indicated in a codepoint in the downlink grant transmitted by the base station.

20 Claims, 18 Drawing Sheets

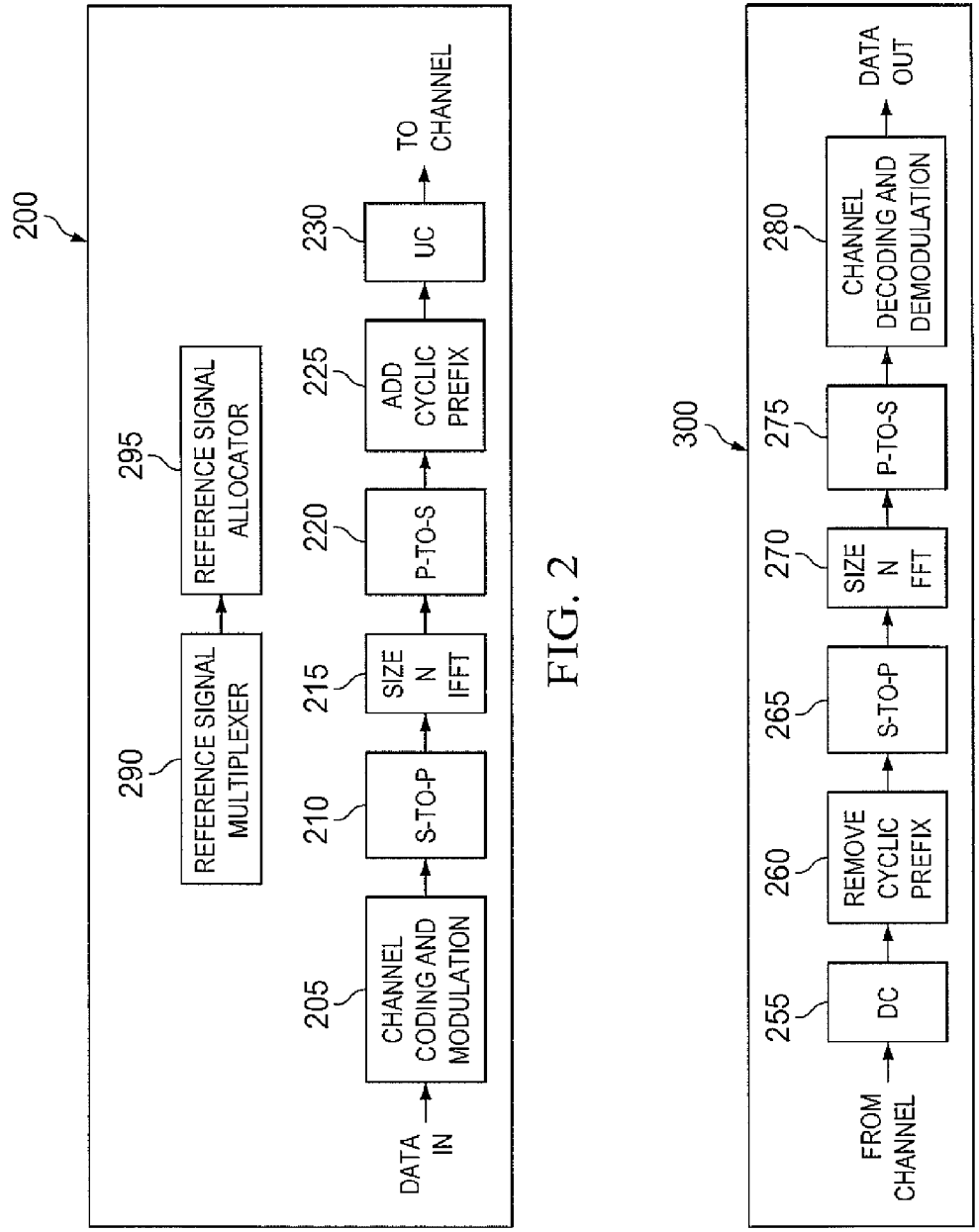

| FIG. 6A |
|---|
| FIG. 6B |

900

| TRANSMISSION MODE A | DCI FORMAT | SEARCH SPACE | TRANSMISSION SCHEME OF PDSCH CORRESPONDING TO PDCCH | DRS INDICATION METHOD |
|---|---|---|---|---|
| PDCCH AND PDSCH CONFIGURED BY C-RNTI | DCI FORMAT 1A | COMMON AND UE SPECIFIC | TRANSMIT DIVERSITY OR SINGLE-LAYER BEAMFORMING | NOT NEEDED |
| | DCI FORMAT 2A' | UE SPECIFIC | DUAL-DRS PORT OR SINGLE-DRS PORT | METHOD AND SYSTEM OF THE PRESENT DISCLOSURE |
| PDCCH AND PDSCH CONFIGURED BY SPS C-RNTI | DCI FORMAT 1A | COMMON AND UE SPECIFIC | SINGLE DRS PORT | DRS PORT ASSIGNED SEMISTATICALLY (AN EXAMPLE: BY HIGHER LAYER) |
| | DCI FORMAT 2A' | UE SPECIFIC | DUAL-DRS PORT OR SINGLE-DRS PORT | METHOD AND SYSTEM OF THE PRESENT DISCLOSURE |

| ENABLED TBs | TB-TO-CW SWAP BIT | ENABLED CWs | ASSIGNED DRS INDICES |
|---|---|---|---|
| TB1 | 0 | 0 | 0 |
| TB1 | 1 | 1 | 1 |
| TB2 | 0 | 1 | 1 |
| TB2 | 1 | 0 | 0 |
| TB1, TB2 | 0 OR 1 | 0 AND 1 | 0 AND 1 |

| NDI BIT OF DISABLED TB | 0 | 1 |
|---|---|---|
| DRS PORT INDEX | 0 | 1 |

FIG. 11

| STATE | DRS SCRAMBLING METHOD |
| --- | --- |
| 1 | CELL-SPECIFIC SCRAMBLING |
| 2 | UE-SPECIFIC SCRAMBLING |

| NEW 1-BIT FIELD ADDED TO THE DCI FORMAT | STATE | DRS SCRAMBLING METHOD |
| --- | --- | --- |
| 0 | 1 | CELL-SPECIFIC SCRAMBLING |
| 1 | 2 | UE-SPECIFIC SCRAMBLING |

FIG. 17

| DCI FORMAT | TRANSMISSION MODE | TRANSMISSION SCHEME | CODEPOINTS IN DL GRANT | STATE | DRS SCRAMBLING METHOD |
|---|---|---|---|---|---|
| UE RECEIVE DCI FORMAT THAT SUPPORTS UP TO 2 TBs, e.g. 2A OR 2A' | PDCCH AND PDSCH CONFIGURED BY EITHER C-RNTI OR SPS-RNTI | SINGLE-DRS PORT OR MULTI-DRS PORT (INCLUDING 2 DRS PORT) | (TB1 ENABLED, TB2 DISABLED); OR (TB1 DISABLED, TB2 ENABLED) | 1 | CELL-SPECIFIC SCRAMBLING |
| | | | BOTH TB1 AND TB2 ENABLED | 2 | UE-SPECIFIC SCRAMBLING |
| UE RECEIVE DCI FORMAT THAT SUPPORTS ONLY 1 TB, e.g. 1A OR 1A' | PDCCH AND PDSCH CONFIGURED BY C-RNTI OR SPS-RNTI (*) | TRANSMIT DIVERSITY IF Tx ANTENNA NUMBER >2; SINGLE-PORT OTHERWISE | N/A -- FIXED AND NOT DEPENDENT ON MESSAGE FIELDS IN DL GRANT | 2 | UE-SPECIFIC SCRAMBLING, IF DRS IS CONFIGURED |
| | | SINGLE-DRS PORT | N/A -- FIXED AND NOT DEPENDENT ON MESSAGE FIELDS IN DL GRANT | 1 | CELL-SPECIFIC SCRAMBLING |

1700

1800

| STATE | DRS SCRAMBLING METHOD |
|---|---|
| 1 | GROUP-SPECIFIC SCRAMBLING |
| 2 | UE-SPECIFIC SCRAMBLING |

1900

| NEW 1-BIT FIELD ADDED TO THE DCI FORMAT | STATE | DRS SCRAMBLING METHOD |
|---|---|---|
| 0 | 1 | GROUP-SPECIFIC SCRAMBLING |
| 1 | 2 | UE-SPECIFIC SCRAMBLING |

FIG. 20

| DCI FORMAT | TRANSMISSION MODE | TRANSMISSION SCHEME | CODEPOINTS IN DL GRANT | STATE | DRS SCRAMBLING METHOD |
|---|---|---|---|---|---|
| UE RECEIVE DCI FORMAT THAT SUPPORTS UP TO 2 TBs, e.g. 2A OR 2A' | PDCCH AND PDSCH CONFIGURED BY EITHER C-RNTI OR SPS-RNTI | SINGLE-DRS PORT OR MULTI-DRS PORT (INCLUDING 2 DRS PORT) | (TB1 ENABLED, TB2 DISABLED); OR (TB1 DISABLED, TB2 ENABLED) | 1 | GROUP-SPECIFIC SCRAMBLING |
| | | | BOTH TB1 AND TB2 ENABLED | 2 | UE-SPECIFIC SCRAMBLING |
| UE RECEIVE DCI FORMAT THAT SUPPORTS ONLY 1 TB, e.g. 1A OR 1A' | PDCCH AND PDSCH CONFIGURED BY C-RNTI OR SPS-RNTI (*) | TRANSMIT DIVERSITY IF Tx ANTENNA NUMBER >2; SINGLE-PORT OTHERWISE | N/A -- FIXED AND NOT DEPENDENT ON MESSAGE FIELDS IN DL GRANT | 2 | UE-SPECIFIC SCRAMBLING, IF DRS IS CONFIGURED |
| | | SINGLE-DRS PORT | N/A -- FIXED AND NOT DEPENDENT ON MESSAGE FIELDS IN DL GRANT | 1 | GROUP-SPECIFIC SCRAMBLING |

| DCI FORMAT | TRANSMISSION MODE | TRANSMISSION SCHEME | CODEPOINTS IN DL GRANT - NUMBER OF ENABLED TBs | CODEPOINTS IN DL GRANT - BIT TO BE REINTERPRETED IN THE GRANT | STATE | DRS SCRAMBLING METHOD (SU/MU) |
|---|---|---|---|---|---|---|
| UE RECEIVE DCI FORMAT THAT SUPPORTS UP TO 2 TBs, e.g. 2A OR 2A' | PDCCH AND PDSCH CONFIGURED BY EITHER C-RNTI OR SPS-RNTI | SINGLE-DRS PORT OR MULTI-DRS PORT (INCLUDING 2 DRS PORT) | (TB1 ENABLED, TB2 DISABLED); OR (TB1 DISABLED, TB2 ENABLED) | 0 | 1 | CELL-SPECIFIC SCRAMBLING (MU-MIMO, TOTAL RANK >1**) |
| | | | | 1 | 2 | UE-SPECIFIC SCRAMBLING (SU-MIMO, TOTAL RANK 1) |
| | | | BOTH TB1 AND TB2 ENABLED | | 2 | UE-SPECIFIC SCRAMBLING (SU-MIMO, TOTAL RANK >1**) |
| | | TRANSMIT DIVERSITY IF Tx ANTENNA NUMBER >2; SINGLE-PORT OTHERWISE | n/a -- FIXED AND NOT DEPENDENT ON MESSAGE FIELDS IN DL GRANT | | 2 | UE-SPECIFIC SCRAMBLING, IF DRS IS CONFIGURED (SU-MIMO) |
| UE RECEIVE DCI FORMAT THAT SUPPORTS ONLY 1 TB, e.g. 1A OR 1A' (*) | PDCCH AND PDSCH CONFIGURED BY C-RNTI OR SPS-RNTI (*) | SINGLE-DRS PORT | n/a -- FIXED AND NOT DEPENDENT ON MESSAGE FIELDS IN DL GRANT | | 1 | CELL-SPECIFIC SCRAMBLING (SU OR MU) |

*, HERE TOTAL RANK >1 IS A GENERAL FORMULA. IN THE CASE OF DUAL-LAYER BEAMFORMING, TOTAL RANK IS 2

**,

| RE-INTERPRETED TB-TO-CW SWAP BIT | RE-INTERPRETED NDI BIT OF THE DISABLED TB | (GROUP IDENTIFICATION, STREAM IDENTIFICATION) |
|---|---|---|
| 0 | 0 | (0,0) |
| 0 | 1 | (0,1) |
| 1 | 0 | (1,0) |
| 1 | 1 | (1,1) |

| RE-INTERPRETED TB-TO-CW SWAP BIT | RE-INTERPRETED NDI BIT OF THE DISABLED TB | (GROUP IDENTIFICATION, STREAM IDENTIFICATION) |
|---|---|---|
| 0 | 0 | (0,0) |
| 0 | 1 | (1,0) |
| 1 | 0 | (0,1) |
| 1 | 1 | (1,1) |

METHOD AND SYSTEM OF MULTI-LAYER BEAMFORMING

CROSS-REFERENCE TO RELATED APPLICATION(S) AND CLAIM OF PRIORITY

The present application is related to U.S. Provisional Patent Application No. 61/250,782, filed Oct. 12, 2009, entitled "MULTI-USER MIMO TRANSMISSIONS AND SIGNALING IN WIRELESS COMMUNICATION SYSTEMS" and U.S. Provisional Patent Application No. 61/278, 835, filed Oct. 13, 2009, entitled "MULTI-LAYER BEAMFORMING METHODS IN WIRELESS COMMUNICATION SYSTEMS". Provisional Patent Application Nos. 61/250,782 and 61/278,835 are assigned to the assignee of the present application and are hereby incorporated by reference into the present application as if fully set forth herein. The present application hereby claims priority under 35 U.S.C. §119(e) to U.S. Provisional Patent Application Nos. 61/250,782 and 61/278,835.

TECHNICAL FIELD OF THE INVENTION

The present application relates generally to wireless communications and, more specifically, to a method and system for multi-layer beamforming.

BACKGROUND OF THE INVENTION

In 3$^{rd}$ Generation Partnership Project Long Term Evolution (3GPP LTE), Orthogonal Frequency Division Multiplexing (OFDM) is adopted as a downlink (DL) transmission scheme.

SUMMARY OF THE INVENTION

A base station is provided. The base station comprises a reference signal sequence generator configured to generate a reference signal sequence for a reference signal for each of n antenna ports using one initialization seed $c_{init}$ with n being a positive integer. The initialization seed is defined as:

$$c_{init}=(\lfloor n_s/2 \rfloor+1) \cdot (2N_{ID}^{cell}+1) \cdot 2^{16}+N_{ID}^{group},$$

where $n_s$ is a first slot number in a subframe, $N_{ID}^{cell}$ is a cell identifier of the base station, and $N_{ID}^{group}$ is a group identifier. The base station also comprises a transmit path circuitry configured to transmit a downlink grant and the reference signal.

A method of operating a base station is provided. The method comprises generating a reference signal sequence for a reference signal for each of n antenna ports using one initialization seed $c_{init}$ with n being a positive integer. The initialization seed is defined as:

$$c_{init}=(\lfloor n_s/2 \rfloor+1) \cdot (2N_{ID}^{cell}+1) \cdot 2^{16}+N_{ID}^{group},$$

where $n_s$ is a first slot number in a subframe, $N_{ID}^{cell}$ is a cell identifier of the base station, and $N_{ID}^{group}$ is a group identifier. The method also comprises transmitting a downlink grant and the reference signal.

A subscriber station is provided. The subscriber station comprises a receive path circuitry configured to receive a downlink grant from a base station. The receive path circuitry is also configured to receive a reference signal generated at the base station using one initialization seed $c_{init}$. The initialization seed is defined as:

$$c_{init}=(\lfloor n_s/2 \rfloor+1) \cdot (2N_{ID}^{cell}+1) \cdot 2^{16}+N_{ID}^{group},$$

where $n_s$ is a first slot number in a subframe, $N_{ID}^{cell}$ is a cell identifier of the base station, $N_{ID}^{cell}$ is a group identifier. A method of operating a subscriber station is provided. The method comprising receiving a downlink grant from a base station, and receiving a reference signal generated at the base station using one initialization seed $c_{init}$. The initialization seed is defined as:

$$c_{init}=(\lfloor n_s/2 \rfloor+1) \cdot (2N_{ID}^{cell}+1) \cdot 2^{16}+N_{ID}^{group},$$

where $n_s$ is a first slot number in a subframe, $N_{ID}^{cell}$ is a cell identifier of the base station, and $N_{ID}^{group}$ is a group identifier.

In some embodiments, the group identifier $N_{ID}^{group}$ is a one-bit group identifier dynamically indicated in a codepoint in the downlink grant transmitted by the base station.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts:

FIG. 2 is a high-level diagram of an orthogonal frequency division multiple access (OFDMA) transmitter according to one embodiment of this disclosure;

FIG. 3 is a high-level diagram of an OFDMA receiver according to one embodiment of this disclosure;

FIG. 9 illustrates a table summarizing downlink control information (DCI) formats used for downlink (DL) grants according to an embodiment of this disclosure;

FIG. 10 illustrates a table showing a mapping of enabled codewords to a stream index and a dedicated reference signal (DRS) index according to an embodiment of this disclosure;

FIG. 11 illustrates a table showing a mapping of a new data indicator (NDI) bit of a disabled codeword to a stream index and a dedicated reference signal (DRS) index according to an embodiment of this disclosure;

FIG. 17 illustrates a table summarizing the indication of the DRS scrambling method as a function of the DCI format, the number of enabled transport blocks (TBs) and the transmission mode according to an embodiment of this disclosure;

FIG. 20 illustrates a table summarizing the indication of the DRS scrambling method as a function of the DCI format, the number of enabled TBs and the transmission mode according to another embodiment of this disclosure;

FIG. 21 illustrates a table depicting use of an existing bit in a particular downlink (DL) grant to indicate the choice of cell-specific scrambling or UE-specific scrambling according to an embodiment of this disclosure;

DETAILED DESCRIPTION OF THE INVENTION

FIGS. 1 through 32, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communication system.

With regard to the following description, it is noted that the long term evolution (LTE) term "node B" is another term for "base station" used below. Also, the LTE term "user equipment" or "UE" is another term for "subscriber station" used below.

Figure 1:
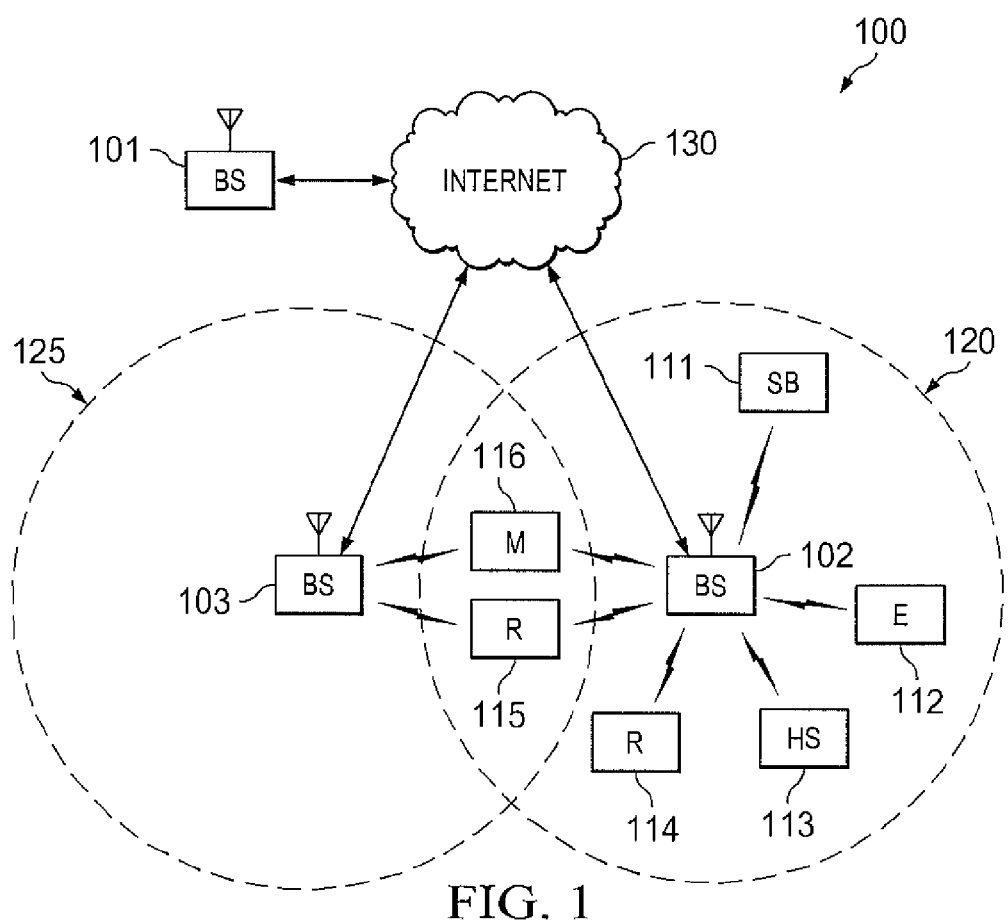
FIG. 1 illustrates an exemplary wireless network that transmits messages in the uplink according to the principles of this disclosure.

FIG. 1 illustrates exemplary wireless network 100, which transmits messages according to the principles of the present disclosure. In the illustrated embodiment, wireless network 100 includes base station (BS) 101, base station (BS) 102, base station (BS) 103, and other similar base stations (not shown).

Base station 101 is in communication with Internet 130 or a similar IP-based network (not shown).

Base station 102 provides wireless broadband access to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a wireless fidelity (WiFi) hotspot (HS), subscriber station 114, which may be located in a first residence (R), subscriber station 115, which may be located in a second residence (R), and subscriber station 116, which may be a mobile device (M), such as a cell phone, a wireless laptop, a wireless personal data or digital assistant (PDA), or the like.

Base station 103 provides wireless broadband access to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

While only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi wireless local area network (WLAN). Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

FIG. 2 is a high-level diagram of an orthogonal frequency division multiple access (OFDMA) transmit path 200. FIG. 3 is a high-level diagram of an orthogonal frequency division multiple access (OFDMA) receive path 300. In FIGS. 2 and 3, the OFDMA transmit path 200 is implemented in base station (BS) 102 and the OFDMA receive path 300 is implemented in subscriber station (SS) 116 for the purposes of illustration and explanation only. However, it will be understood by those skilled in the art that the OFDMA receive path 300 may also be implemented in BS 102 and the OFDMA transmit path 200 may be implemented in SS 116.

The transmit path 200 in BS 102 comprises a channel coding and modulation block 205, a serial-to-parallel (S-to-P) block 210, a Size N Inverse Fast Fourier Transform (IFFT) block 215, a parallel-to-serial (P-to-S) block 220, an add cyclic prefix block 225, an up-converter (UC) 230, a reference signal multiplexer 290, and a reference signal allocator 295.

The receive path 300 in SS 116 comprises a down-converter (DC) 255, a remove cyclic prefix block 260, a serial-to-parallel (S-to-P) block 265, a Size N Fast Fourier Transform (FFT) block 270, a parallel-to-serial (P-to-S) block 275, and a channel decoding and demodulation block 280.

At least some of the components in FIGS. 2 and 3 may be implemented in software while other components may be implemented by configurable hardware or a mixture of software and configurable hardware. In particular, it is noted that the FFT blocks and the IFFT blocks described in the present disclosure document may be implemented as configurable software algorithms, where the value of Size N may be modified according to the implementation.

Furthermore, although the present disclosure is directed to an embodiment that implements the Fast Fourier Transform and the Inverse Fast Fourier Transform, this is by way of illustration only and should not be construed to limit the scope of the disclosure. It will be appreciated that in an alternate embodiment of the disclosure, the Fast Fourier Transform functions and the Inverse Fast Fourier Transform functions may easily be replaced by Discrete Fourier Transform (DFT) functions and Inverse Discrete Fourier Transform (IDFT) functions, respectively. It will be appreciated that, for DFT and IDFT functions, the value of the N variable may be any integer number (i.e., 1, 2, 3, 4, etc.), while for FFT and IFFT functions, the value of the N variable may be any integer number that is a power of two (i.e., 1, 2, 4, 8, 16, etc.).

In BS 102, channel coding and modulation block 205 receives a set of information bits, applies coding (e.g., Turbo coding) and modulates (e.g., quadrature phase-shift keying (QPSK), quadrature amplitude modulation (QAM)) the input bits to produce a sequence of frequency-domain modulation symbols. Serial-to-parallel block 210 converts (i.e., de-multiplexes) the serial modulated symbols to parallel data to produce N parallel symbol streams where N is the IFFT/FFT size used in BS 102 and SS 116. Size N IFFT block 215 then performs an IFFT operation on the N parallel symbol streams to produce time-domain output signals. Parallel-to-serial block 220 converts (i.e., multiplexes) the parallel time-domain output symbols from Size N IFFT block 215 to produce a serial time-domain signal. Add cyclic prefix block 225 then inserts a cyclic prefix to the time-domain signal. Finally, up-converter 230 modulates (i.e., up-converts) the output of add cyclic prefix block 225 to radio frequency (RF) for transmission via a wireless channel. The signal may also be filtered at baseband before conversion to RF frequency. In some embodiments, reference signal multiplexer 290 is operable to multiplex the reference signals using code division multiplexing (CDM) or time/frequency division multiplexing (TFDM). Reference signal allocator 295 is operable to dynamically allocate reference signals in an OFDM signal in accordance with the methods and system disclosed in the present disclosure.

The transmitted RF signal arrives at SS 116 after passing through the wireless channel and reverse operations performed at BS 102. Down-converter 255 down-converts the received signal to baseband frequency and remove cyclic prefix block 260 removes the cyclic prefix to produce the serial time-domain baseband signal. Serial-to-parallel block 265 converts the time-domain baseband signal to parallel time domain signals. Size N FFT block 270 then performs an FFT algorithm to produce N parallel frequency-domain signals. Parallel-to-serial block 275 converts the parallel frequency-domain signals to a sequence of modulated data symbols. Channel decoding and demodulation block 280 demodulates and then decodes the modulated symbols to recover the original input data stream.

Each of base stations 101-103 may implement a transmit path that is analogous to transmitting in the downlink to subscriber stations 111-116 and may implement a receive path that is analogous to receiving in the uplink from subscriber stations 111-116. Similarly, each one of subscriber stations 111-116 may implement a transmit path corresponding to the architecture for transmitting in the uplink to base stations 101-103 and may implement a receive path corresponding to the architecture for receiving in the downlink from base stations 101-103.

The total bandwidth in an OFDM system is divided into narrowband frequency units called subcarriers. The number of subcarriers is equal to the FFT/IFFT size N used in the system. In general, the number of subcarriers used for data is less than N because some subcarriers at the edge of the frequency spectrum are reserved as guard subcarriers. In general, no information is transmitted on guard subcarriers.

The transmitted signal in each downlink (DL) slot of a resource block is described by a resource grid of $N_{RB}^{DL}N_{sc}^{RB}$ subcarriers and $N_{symb}^{DL}$ OFDM symbols. The quantity $N_{RB}^{DL}$ depends on the downlink transmission bandwidth configured in the cell and fulfills $N_{RB}^{min,DL} \leq N_{RB}^{DL} \leq N_{RB}^{max,DL}$, where $N_{RB}^{min,DL}$ and $N_{RB}^{max,DL}$ are the smallest and largest downlink bandwidth, respectively, supported. In some embodiments, subcarriers are considered the smallest elements that are capable of being modulated.

In case of multi-antenna transmission, there is one resource grid defined per antenna port.

Each element in the resource grid for antenna port p is called a resource element (RE) and is uniquely identified by the index pair (k,l) in a slot where $k=0, \ldots, N_{RB}^{DL}N_{sc}^{RB}-1$ and $l=0, \ldots, N_{symb}^{DL}-1$ are the indices in the frequency and time domains, respectively. Resource element (k,l) on antenna port p corresponds to the complex value $a_{k,l}^{(p)}$. If there is no risk for confusion or no particular antenna port is specified, the index p may be dropped.

In LTE, DL reference signals (RSs) are used for two purposes. First, UEs measure channel quality information (CQI), rank information (RI) and precoder matrix information (PMI) using DL RSs. Second, each UE demodulates the DL transmission signal intended for itself using the DL RSs. In addition, DL RSs are divided into three categories: cell-specific RSs, multi-media broadcast over a single frequency network (MBSFN) RSs, and UE-specific RSs or dedicated RSs (DRSs).

Cell-specific reference signals (or common reference signals: CRSs) are transmitted in all downlink subframes in a cell supporting non-MBSFN transmission. If a subframe is used for transmission with MBSFN, only the first few (0, 1 or 2) OFDM symbols in a subframe can be used for transmission of cell-specific reference symbols. The notation $R_p$ is used to denote a resource element used for reference signal transmission on antenna port p.

UE-specific reference signals (or dedicated RS: DRS) are supported for single-antenna-port transmission on the Physical Downlink Shared Channel (PDSCH) and are transmitted on antenna port 5. The UE is informed by higher layers whether the UE-specific reference signal is present and is a valid phase reference for PDSCH demodulation or not. UE-specific reference signals are transmitted only on the resource blocks upon which the corresponding PDSCH is mapped.

The time resources of an LTE system are partitioned into 10 msec frames, and each frame is further partitioned into 10 subframes of one msec duration each. A subframe is divided into two time slots, each of which spans 0.5 msec. A subframe is partitioned in the frequency domain into multiple resource blocks (RBs), where an RB is composed of 12 subcarriers.

Figure 4:
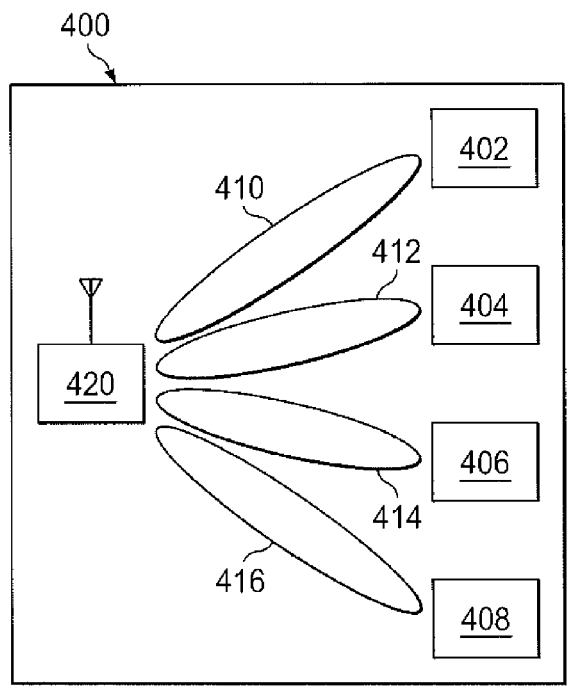
FIG. 4 illustrates a diagram of a base station in communication with a plurality of mobile stations according to an embodiment of this disclosure.

FIG. 4 illustrates a diagram 400 of a base station 420 in communication with a plurality of mobile stations 402, 404, 406, and 408 according to an embodiment of this disclosure.

As shown in FIG. 4, base station 420 simultaneously communicates with multiple of mobile stations through the use of multiple antenna beams, each antenna beam is formed toward its intended mobile station at the same time and same frequency. Base station 420 and mobile stations 402, 404, 406, and 408 are employing multiple antennas for transmission and reception of radio wave signals. The radio wave signals can be Orthogonal Frequency Division Multiplexing (OFDM) signals.

In this embodiment, base station 420 performs simultaneous beamforming through a plurality of transmitters to each mobile station. For instance, base station 420 transmits data to mobile station 402 through a beamformed signal 410, data to mobile station 404 through a beamformed signal 412, data to mobile station 406 through a beamformed signal 414, and data to mobile station 408 through a beamformed signal 416. In some embodiments of this disclosure, base station 420 is capable of simultaneously beamforming to the mobile stations 402, 404, 406, and 408. In some embodiments, each beamformed signal is formed toward its intended mobile station at the same time and the same frequency. For the purpose of clarity, the communication from a base station to a mobile station may also be referred to as downlink communication, and the communication from a mobile station to a base station may be referred to as uplink communication.

Base station 420 and mobile stations 402, 404, 406, and 408 employ multiple antennas for transmitting and receiving wireless signals. It is understood that the wireless signals may be radio wave signals, and the wireless signals may use any transmission scheme known to one skilled in the art, including an Orthogonal Frequency Division Multiplexing (OFDM) transmission scheme.

Mobile stations 402, 404, 406, and 408 may be any device that is capable receiving wireless signals. Examples of mobile stations 402, 404, 406, and 408 include, but are not limited to, a personal data or digital assistant (PDA), laptop, mobile telephone, handheld device, or any other device that is capable of receiving the beamformed transmissions.

The use of multiple transmit antennas and multiple receive antennas at both a base station and a single mobile station to improve the capacity and reliability of a wireless communication channel is known as a Single User Multiple Input Multiple Output (SU-MIMO) system. A MIMO system promises linear increase in capacity with K where K is the minimum of number of transmit (M) and receive antennas (N) (i.e., K=min(M,N)). A MIMO system can be implemented with the schemes of spatial multiplexing, a transmit/receive beamforming, or transmit/receive diversity.

As an extension of SU-MIMO, multi-user MIMO (MU-MIMO) is a communication scenario where a base station with multiple transmit antennas can simultaneously communicate with multiple mobile stations through the use of multi-user beamforming schemes such as Spatial Division Multiple Access (SDMA) to improve the capacity and reliability of a wireless communication channel.

Figure 5:
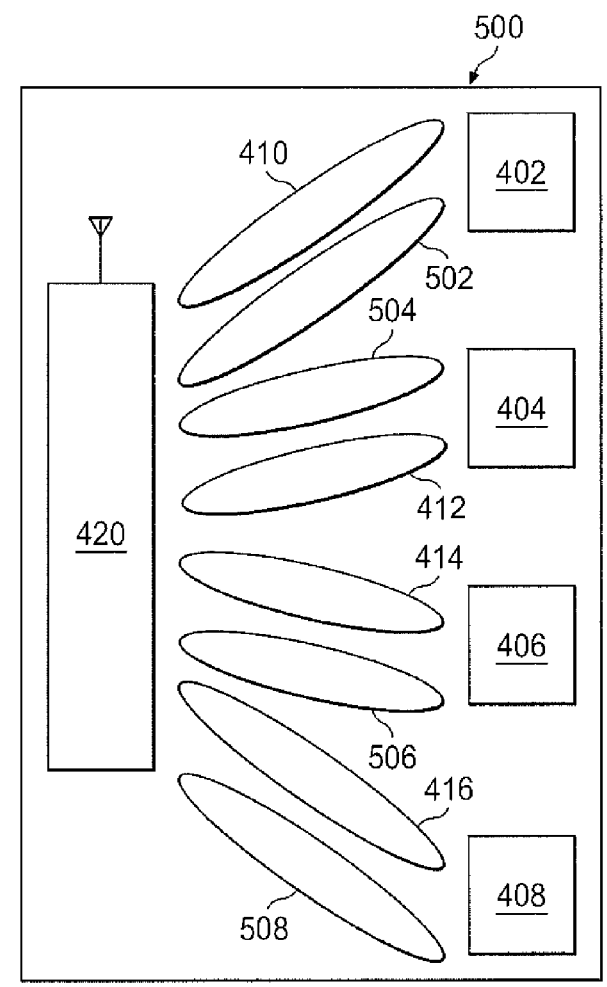
FIG. 5 illustrates a spatial division multiple access (SDMA) scheme according to an embodiment of this disclosure.

FIG. 5 illustrates an SDMA scheme according to an embodiment of this disclosure.

As shown in FIG. 5, base station 420 is equipped with 8 transmit antennas while mobile stations 402, 404, 406, and 408 are each equipped two antennas. In this example, base station 420 has eight transmit antennas. Each of the transmit antennas transmits one of beamformed signals 410, 502, 504, 412, 414, 506, 416, and 508. In this example, mobile station 402 receives beamformed transmissions 410 and 502, mobile station 404 receives beamformed transmissions 504 and 412, mobile station 406 receives beamformed transmissions 506 and 414, and mobile station 408 receives beamformed transmissions 508 and 416.

Since base station 420 has eight transmit antenna beams (each antenna beams one stream of data streams), eight streams of beamformed data can be formed at base station 420. Each mobile station can potentially receive up to 2 streams (beams) of data in this example. If each of the mobile stations 402, 404, 406, and 408 was limited to receive only a single stream (beam) of data, instead of multiple streams simultaneously, this would be multi-user beamforming (i.e., MU-BF).

Downlink Control Information (DCI) format 1A is used for the compact scheduling of one PDSCH codeword and random access procedure initiated by a Physical Downlink Control Channel (PDCCH) order.

The following information is transmitted by means of the DCI format 1A:

flag for format0/format1A differentiation—1 bit, where value 0 indicates format 0 and value 1 indicates format 1A.

Format 1A is used for a random access procedure initiated by a PDCCH order only if the format 1A redundancy check (CRC) is scrambled with the cell radio network temporary identifier (C-RNTI) and all the remaining fields are set as follows:

localized/distributed virtual resource block (VRB) assignment flag—1 bit is set to '0';
resource block assignment—$\lceil \log_2(N_{RB}^{DL}(N_{RB}^{NL}+1)/2) \rceil$ bits, where all bits are set to 1;
preamble index—6 bits; and
physical random access channel (PRACH) mask index—4 bits.

All the remaining bits in format 1A for the compact scheduling assignment of one PDSCH codeword are set to zeroes.
Otherwise,
localized/distributed VRB assignment flag—1 bit as defined in section 7.1.6.3 of 3GPP TS 36.213 v8.6.0, "E-UTRA, Physical Layer Procedures", March 2009, which is hereby incorporated by reference into the present application as if fully set forth herein;
resource block assignment—$\lceil \log_2(N_{RB}^{DL}(N_{RB}^{DL}+1)/2) \rceil$ bits as defined in section 7.1.6.3 of 3GPP TS 36.213 v8.6.0, "E-UTRA, Physical Layer Procedures", March 2009:

for localized VRB:
$\lceil \log_2(N_{RB}^{DL}(N_{RB}^{DL}+1)/2) \rceil$ bits provide the resource allocation, and
for distributed VRB:
if $N_{RB}^{DL} < 50$ or if the format 1A CRC is scrambled by RA-RNTI, paging radio network temporary identifier (P-RNTI), or system information radio network temporary identifier (SI-RNTI),
$\lceil \log_2(N^D{}_{RB}^{DL}(N_{RB}^{DL}+1)/2) \rceil$ bits provide the resource allocation,
else
1 bit, the most significant bit (MSB) indicates the gap value, where value 0 indicates $N_{gap}=N_{gap,1}$ and value 1 indicates $N_{gap}=N_{gap,2}$, and $(\lceil \log_2(N_{RB}^{DL}(N_{RB}^{DL}+1)/2) \rceil-1)$ bits provide the resource allocation;
modulation and coding scheme—5 bits as defined in section 7.1.7 of 3GPP TS 36.213 v8.6.0, "E-UTRA, Physical Layer Procedures", March 2009, which is hereby incorporated by reference into the present application as if fully set forth herein;
hybrid automatic repeat request (HARQ) process number—3 bits (Frequency Division Duplex (FDD)), 4 bits (Time Division Duplex (TDD));
new data indicator—1 bit:
if the format 1A CRC is scrambled by RA-RNTI, P-RNTI, or SI-RNTI:
if $N_{RB}^{DL} \geq 50$ and the localized/distributed VRB assignment flag is set to 1, the new data indicator bit indicates the gap value, where value 0 indicates $N_{gap}=N_{gap,1}$ and value 1 indicates $N_{gap}=N_{gap,2}$,
else the new data indicator bit is reserved,
else, the new data indicator bit;
redundancy version—2 bits;
transmit power control (TPC) command for physical uplink control channel (PUCCH)—2 bits as defined in section 5.1.2.1 of 3GPP TS 36.213 v8.6.0, "E-UTRA, Physical Layer Procedures", March 2009, which is hereby incorporated by reference into the present application as if fully set forth herein,
if the format 1A CRC is scrambled by RA-RNTI, P-RNTI, or SI-RNTI:
the most significant bit of the TPC command is reserved,
the least significant bit of the TPC command indicates column $N_{PRB}^{1A}$ of the transport block size (TBS) table defined in 3GPP TS 36.213 v8.6.0, "E-UTRA, Physical Layer Procedures", March 2009, and
if least significant bit is 0, then $N_{PRB}^{1A}=2$, else $N_{PRB}^{1A}=3$,
else
the two bits including the most significant bit indicates the TPC command; and
downlink assignment index (this field is present in TDD for all the uplink-downlink configurations and only applies to TDD operation with uplink-downlink configuration 1-6. This field is not present in FDD)—2 bits.

If the number of information bits in format 1A is less than that of format 0, zeros are appended to format 1A until the payload size equals that of format 0.

If the number of information bits in format 1A belongs to one of the sizes in Table 5.3.3.1.2-1, one zero bit is appended to format 1A.

When the format 1A CRC is scrambled with a RA-RNTI, P-RNTI, or SI-RNTI, then the following fields among the fields above are reserved:

HARQ process number; and
downlink assignment index (used for TDD only and is not present in FDD).

Compact DCI format for MU-MIMO is discussed in 3GPP R1-094350.

DCI format 1A is present for all seven transmission modes in LTE Rel-8. One purpose of DCI format 1A is to allow for a fallback operation as it is size efficient and uses transmit diversity for robust operation. The same principle can be used in Rel-9 for delay sum beamforming (DS-BF), although the actual transmit diversity operation needs further discussion (e.g., transparent precoding shifting or Alamouti-based). In any case, since DCI format 1A is size-matched with DCI format 0, the new compact DCI format should have the same size as DCI format 0.

There are two antenna ports associated with each of the new transmission modes. Therefore, in order to support MU-MIMO operation, a UE has to be explicitly signalled the antenna port index. One bit is sufficient to enable such a signaling.

In DCI format 1A, there is a flag to indicate whether the assignment is localized or distributed. For a UE-RS based beamforming operation, distributed resource allocation is of little value since UE-RS patterns are optimized for the localized assignment type. As a result, it is reasonable to re-interpret this bit as the antenna port index. The resulting DCI format can be called DCI format 1E.

The corresponding PDSCH transmission schemes associated with DCI format 1E rely on one of the new antenna ports, and are up to eNodeB implementation. In order to support a seamless DL transmission mode transition, DCI format 1A still needs to be supported for C-RNTI. To distinguish DCI format 1E and DCI format 1A, different CRC scramblings can be applied.

The DCI format 2A is defined for downlink open-loop spatial multiplexing in Section 5.3.3.1.5A of 3GPP TS 36.212 v 8.6.0, "E-UTRA, Multiplexing and Channel coding", March 2009, which is hereby incorporated by reference into the present application as if fully set forth herein.

The following information is transmitted by means of the DCI format 2A:
resource allocation header (resource allocation type 0/type 1)—1 bit as defined in section 7.1.6 of 3GPP TS 36.213 v8.6.0, "E-UTRA, Physical Layer Procedures", March 2009, which is hereby incorporated by reference into the present application as if fully set forth herein;
if downlink bandwidth is less than or equal to 10 physical resource blocks (PRBs), there is no resource allocation header and resource allocation type 0 is assumed;
resource block assignment:
for resource allocation type 0 as defined in section 7.1.6.1 of 3GPP TS 36.213 v8.6.0, "E-UTRA, Physical Layer Procedures", March 2009, which is hereby incorporated by reference into the present application as if fully set forth herein,
$\lceil N_{RB}^{DL}/P \rceil$ bits provide the resource allocation,
for resource allocation type 1 as defined in section 7.1.6.2 of 3GPP TS 36.213 v8.6.0, "E-UTRA, Physical Layer Procedures", March 2009, which is hereby incorporated by reference into the present application as if fully set forth herein,
$\lceil \log_2(P) \rceil$ bits of this field are used as a header specific to this resource allocation type to indicate the selected resource blocks subset,
1 bit indicates a shift of the resource allocation span, $(\lceil N_{RB}^{DL/P} \rceil - \lceil \log_2(P) \rceil - 1)$ bits provide the resource allocation, where the value of P depends on the number of DL resource blocks as indicated in subclause [7.1.6.1] of 3GPP TS 36.213 v8.6.0, "E-UTRA, Physical Layer Procedures", March 2009, which is hereby incorporated by reference into the present application as if fully set forth herein;

TPC command for PUCCH—2 bits as defined in section 5.1.2.1 of 3GPP TS 36.213 v8.6.0, "E-UTRA, Physical Layer Procedures", March 2009, which is hereby incorporated by reference into the present application as if fully set forth herein;

downlink assignment index (this field is present in TDD for all the uplink-downlink configurations and only applies to TDD operation with uplink-downlink configuration 1-6. This field is not present in FDD)—2 bits;

HARQ process number—3 bits (FDD), 4 bits (TDD); and transport block to codeword swap flag—1 bit.

In addition, for transport block 1:

modulation and coding scheme—5 bits as defined in section 7.1.7 of 3GPP TS 36.213 v8.6.0, "E-UTRA, Physical Layer Procedures", March 2009, which is hereby incorporated by reference into the present application as if fully set forth herein;

new data indicator—1 bit; and redundancy version—2 bits.

In addition, for transport block 2:

modulation and coding scheme—5 bits as defined in section 7.1.7 of 3GPP TS 36.213 v8.6.0, "E-UTRA, Physical Layer Procedures", March 2009, which is hereby incorporated by reference into the present application as if fully set forth herein;

new data indicator—1 bit; and redundancy version—2 bits.

Precoding information—number of bits as specified in Table 5.3.3.1.5A-1.

If both transport blocks are enabled, the transport block to codeword mapping is specified according to Table 5.3.3.1.5-1.

In case one of the transport blocks is disabled, the transport block to codeword swap flag is reserved and the transport block to codeword mapping is specified according to Table 5.3.3.1.5-2.

The precoding information field is defined according to Table 5.3.3.1.5A-2. For a single enabled codeword, index 1 in Table 5.3.3.1.5A-2 is only supported for retransmission of the corresponding transport block if that transport block has previously been transmitted using two layers with open-loop spatial multiplexing.

For transmission with 2 antenna ports, the precoding information field is not present. The number of transmission layers is equal to 2 if both codewords are enabled. Transmit diversity is used if codeword 0 is enabled while codeword 1 is disabled.

If the number of information bits in format 2A belongs to one of the sizes in Table 5.3.3.1.2-1, one zero bit is appended to format 2A.

The modulation order determination is defined for spatial multiplexing in Section 7.1.7.1 of 3GPP TS 36.213 v8.6.0, "E-UTRA, Physical Layer Procedures", March 2009, which is hereby incorporated by reference into the present application as if fully set forth herein.

The UE uses $Q_m=2$ if the DCI CRC is scrambled by P-RNTI, RA-RNTI, or SI-RNTI. Otherwise, the UE uses $I_{MCS}$ and Table 7.1.7.1-1 to determine the modulation order ($Q_m$) used in the physical downlink shared channel.

If the DCI CRC is scrambled by P-RNTI, RA-RNTI, or SI-RNTI, then for DCI format 1A:

the UE sets the TBS index ($I_{TBS}$) equal to $I_{MCS}$ and determines its TBS by the procedure in Section 7.1.7.2.1, for DCI format 1C:

the UE sets the TBS index ($I_{TBS}$) equal to $I_{MCS}$ and determine its TBS from Table 7.1.7.2.3-1, else for $0 \leq I_{MCS} \leq 28$, the UE first determines the TBS index ($I_{TBS}$) using $I_{MCS}$ and Table 7.1.7.1-1 except if the transport block is disabled in DCI formats 2 and 2A as specified below. For a transport block that is not mapped to two-layer spatial multiplexing, the TBS is determined by the procedure in Section 7.1.7.2.1. For a transport block that is mapped to two-layer spatial multiplexing, the TBS is determined by the procedure in Section 7.1.7.2.2;

for $29 \leq I_{MCS} \leq 31$, the TBS is assumed to be as determined from DCI transported in the latest PDCCH for the same transport block using $0 \leq I_{MCS} \leq 28$.

In DCI formats 2 and 2A, a transport block is disabled if $I_{MCS}=0$ and if rvidx=1. Otherwise the transport block is enabled.

The NDI and HARQ process ID, as signalled on the PDCCH, and the TBS, as determined above, are delivered to higher layers.

Demodulation reference signals (DMRSs) are provided for each UE's demodulation. In some cases, the DMRS can be a dedicated RS (DRS) to each UE, implying the RS provided to one UE cannot be utilized by the other UEs scheduled in different frequency bands in the same subframe, or in adjacent subframes in the same frequency band. In the case of multi-antenna transmissions, a number of DRSs are provided for the demodulation of the number of multiple data streams, and each DRS is sometimes precoded with the same precoder used for the data stream.

Figures 6, 6A:
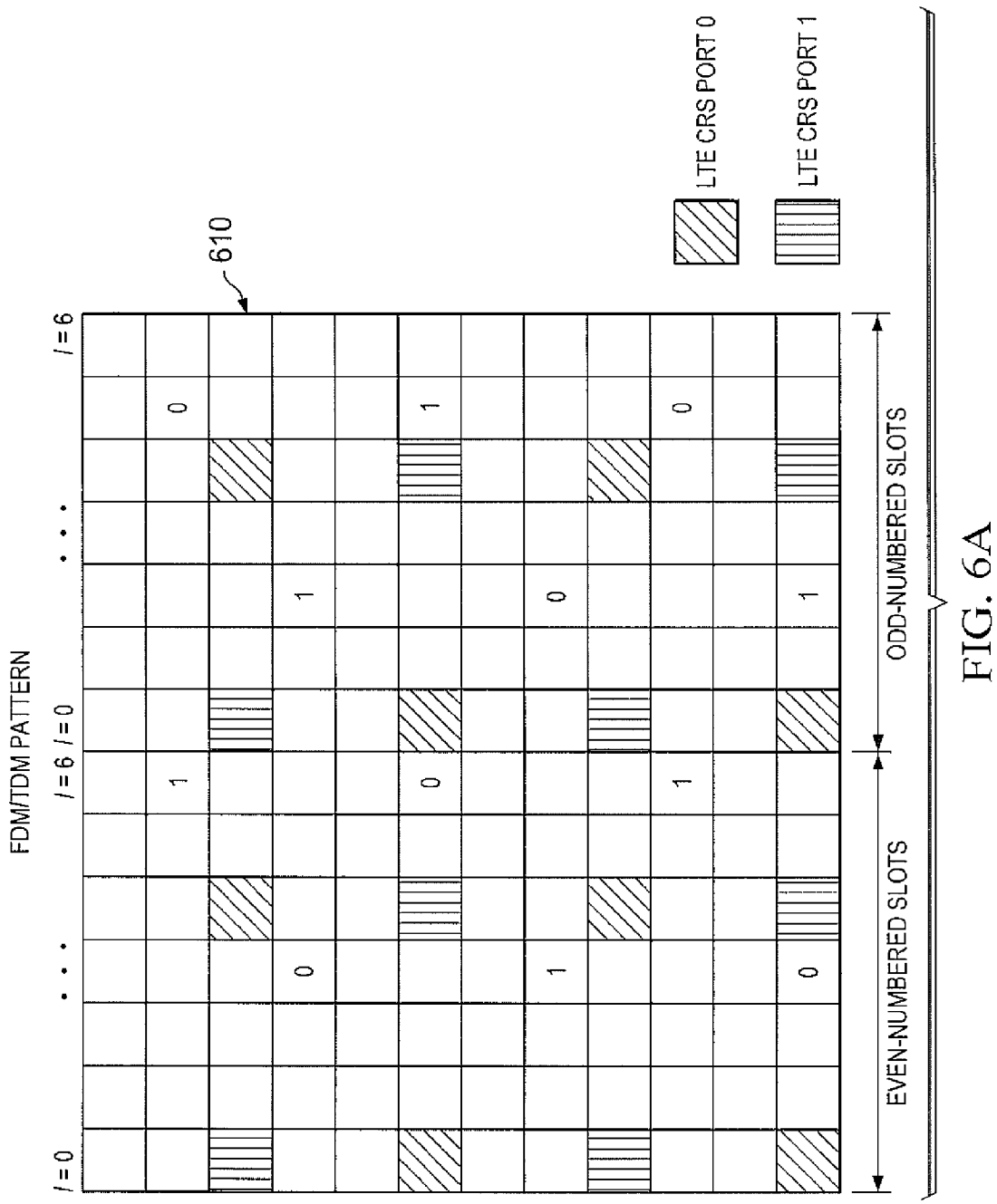
FIG. 6 illustrates reference signal patterns according to an embodiment of this disclosure.
Figure 6B:
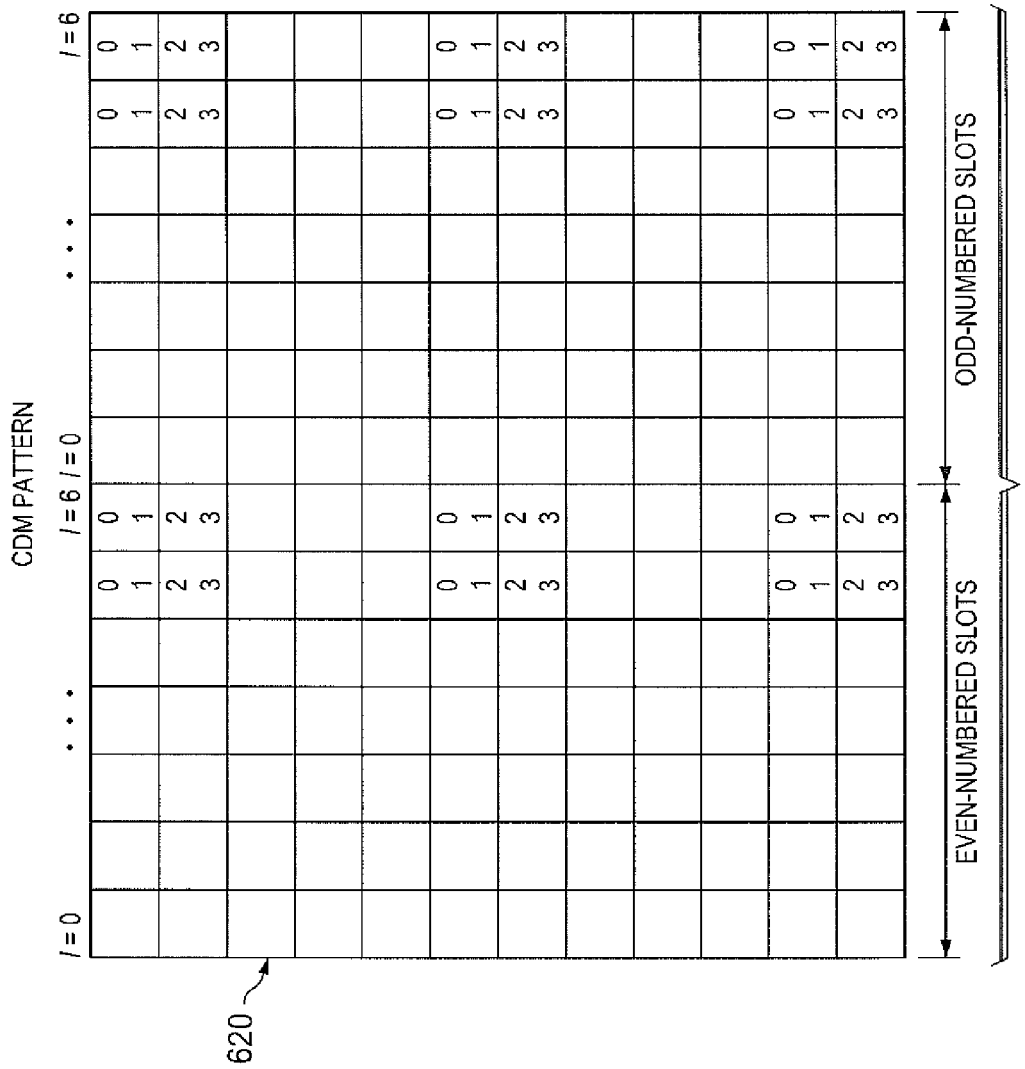

FIG. 6 illustrates reference signal patterns according to an embodiment of this disclosure.

FIG. 6 illustrates a 2-DRS pattern 610 and a 4-DRS pattern 620. Reference signal pattern 610 is an FDM/TDM pilot pattern that can support up to 2 layer transmissions. In reference pattern 610, the DRS REs are partitioned into two groups, the REs labeled with 0 and those with 1. The DRS REs labeled with 0 carry the DRS for layer 0, while the DRS REs labeled with 1 carry the DRS for layer 1.

Reference signal pattern 620 is a CDM/FDM pilot pattern that can support up to four layer transmissions, where DRS REs are again partitioned into two groups, those labeled with 0,1 and those with 2,3. For example, the DRS REs labeled with 0,1 carry the DRS for layers 0 and 1 where the two layers' RSs are code-division multiplexed (CDMed). In the two adjacent DRS REs labeled with 0,1, a DRS symbol r0 for layer 0 is mapped to the two REs spread by a Walsh code [1 1] that results in [r0 r0], while a DRS symbol r1 for layer 1 is mapped to the two REs spread by a Walsh code [1 −1] that results in [r1 −r1].

In one embodiment, it is assumed that a first UE and a second UE are scheduled in a subframe.

In one MU-MIMO transmission mode, for the first UE, i_DRS=0 meaning that the first DRS pattern, DRS(0), is used for this UE.

For the second UE, i_DRS=1 meaning that the second DRS pattern, DRS(1), is used for this UE.

Figure 7:
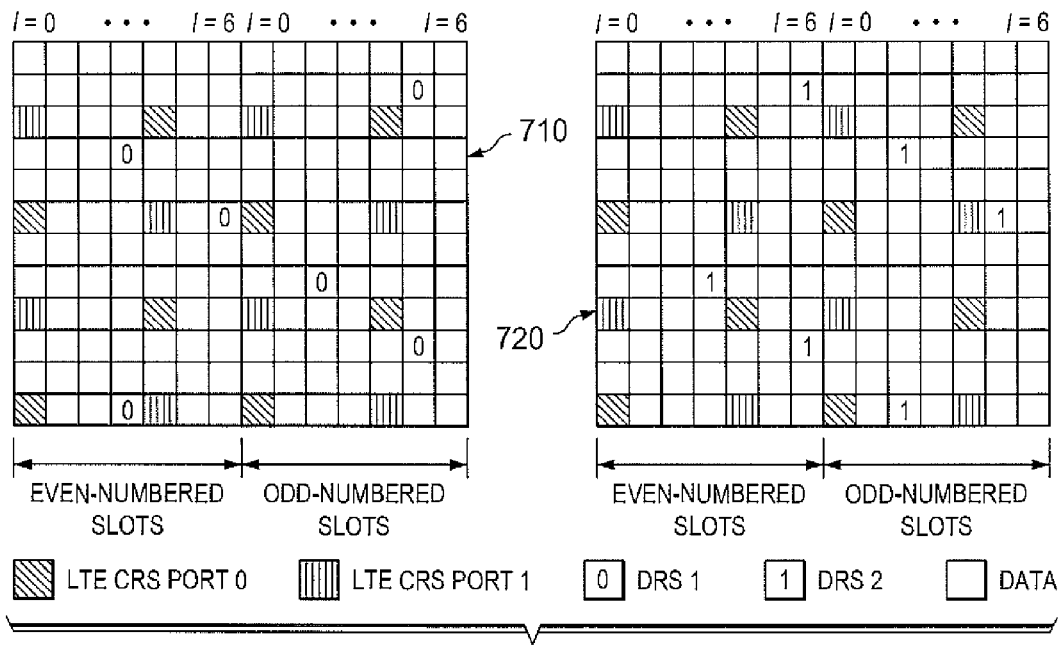
FIG. 7 illustrates data sections and reference signal sections of a reference pattern shown in FIG. 6 from the perspective of two user equipments according to an embodiment of this disclosure.

FIG. 7 illustrates data sections and reference signal sections of the reference pattern 610 from the perspective of two user equipments according to an embodiment of this disclosure.

FIG. 7 illustrates the behavior/observation of the first and second UEs on the data section and the DRS section of the reference pattern 610. As shown in reference signal pattern 710, the first UE only sees DRS(0) as the pilot RE, and the other REs (other than CRS and DRS(0)) are seen by the first UE as data REs. On the other hand, as seen in reference signal pattern 720, the second UE only sees DRS(1) as the pilot RE, and other REs (other than CRS and DRS(1)) are seen by the second as data REs.

Figure 8:
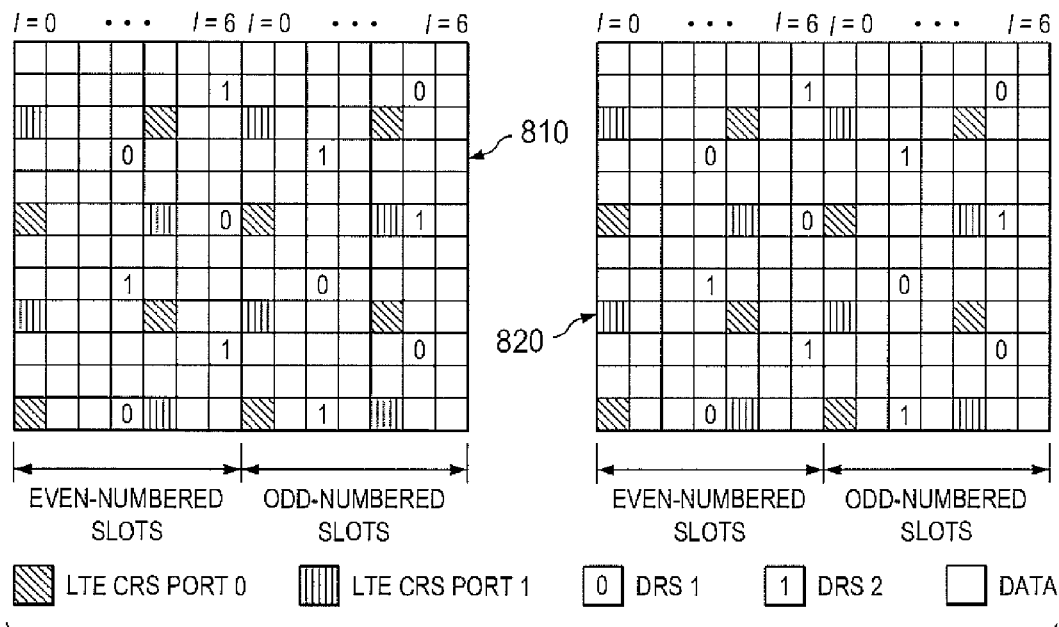
FIG. 8 illustrates data sections and reference signal sections of the reference pattern shown in FIG. 6 from the perspective of two user equipments (UEs) according to another embodiment of this disclosure.

FIG. 8 illustrates data sections and reference signal sections of the reference pattern 610 from the perspective of two user equipments according to another embodiment of this disclosure.

In another MU-MIMO mode, for the first UE, N_DRS=2 and i_DRS=0 meaning that the first DRS pattern, DRS(0), is used for this UE. For the second UE, N_DRS=2 and i_DRS=1 meaning that the second DRS pattern, DRS(1), is used for this UE.

With these assumptions, FIG. 8 illustrates each UE's observation on the data section and the DRS section of the reference pattern 610 according to another embodiment of this disclosure. As shown in reference signal pattern 810, the first UE only sees DRS(0) as the pilot RE, and the REs (other than CRS DRS(0), and DRS(1)) are seen by the first UE as data REs. On the other hand, as seen in reference signal pattern 820, the second UE only sees DRS(1) as the pilot RE, and the REs (other than CRS, DRS(0), DRS(1)) are seen by the second UE as data REs.

Since multiple streams are transmitted by an eNodeB, each UE is to identify its stream by a certain means. Once a UE identifies its streams, the UE uses dedicated reference signals (DRSs) associated with the streams for estimating channels for the demodulation of the transmitted streams. Here, it is assumed that the DRSs for the streams are orthogonal to each other. For example, for demodulation of stream #0, a UE estimates channels using DRS #0 where DRS #0 is precoded with the same precoder used to precode the data stream #0; for demodulation of stream #1, a UE estimates channels using DRS #1 where DRS #1 is precoded with the same precoder used to precode the data stream #1.

For example, when the reference signal pattern 610 in FIG. 6 is used for DRS patterns, the DRS REs for DRS #0 are the RS REs labeled with 0, while the DRS REs for DRS #1 are the RS REs labeled with 1. On the other hand, when the reference signal pattern 620 in FIG. 6 is used for DRS patterns, the DRS #0 is multiplexed with DRS #1 in the same set of pairs of RS REs, and a Walsh code [1 1] is used for DRS #0, while a Walsh code [1 −1] is used for DRS #1.

For supporting MU-MIMO, an eNodeB determines a transmission mode for UEs by higher-layer signaling. In a particular transmission mode, the eNodeB may schedule multiple types of downlink transmissions, e.g., one for normal transmission, another for fallback transmission, and so on. For different types of transmissions, the eNodeB transmits different downlink control information (DCI) formats for the downlink (DL) grants.

FIG. 9 illustrates a table 9000 summarizing downlink control information (DCI) formats used for downlink (DL) grants according to an embodiment of this disclosure.

For supporting MU-MIMO, an eNodeB may determine a transmission mode for UEs by higher-layer signaling. In a transmission mode, an eNodeB may schedule multiple types of downlink transmissions, e.g., one for normal transmission, another for fallback transmission, and so forth. For different types of transmissions, an eNodeB transmits different downlink control information (DCI) formats for the downlink (DL) grants.

As shown in table 900, normal transmission mode is scheduled by DCI format 2A', regardless of whether the transmission is configured by C-RNTI or semi-persistent scheduling (SPS) C-RNTI. In this embodiment, please note that 2A' refers to a slightly modified version of format 2A. In normal transmission mode, a UE can receive up to two streams and up to two DRSs associated with the two streams, and an eNodeB can schedule up to two data streams and up to two DRSs to a number of UEs in a unit of time-frequency resource. UEs in normal transmission mode are aware that the DRS REs for the two DRSs do not carry data symbols for themselves. On the other hand, fallback modes are scheduled by DCI format 1A. When a DL transmission is configured by C-RNTI, the fallback transmission is a transmit diversity or a single-layer beamforming scheme. When a DL transmission is configured by SPS C-RNTI, the fallback transmission is single layer beamforming, where the DRS port index is signaled semi-statically in the upper layer other than the PHY layer. An eNodeB may schedule up to two UEs with different DRS port indices assigned by the higher layer in the same time frequency resource by transmitting up to two DCI format 1A to up to two UEs.

When the DRS port is assigned semi-statically, various methods may be used as described in this disclosure. For example, the UE id may be associated with the DRS port assigned, or UEs with an even UE id would have DRS port 0, while UEs with an odd UE id would have DRS port 1.

FIG. 10 illustrates a table 1000 showing a mapping of enabled codewords to a stream index and a dedicated reference signal (DRS) index according to an embodiment of this disclosure.

In some embodiments of this disclosure, the stream (and the DRS) index is indicated using an enabled codeword (CW) in a DCI format, and the mapping of enabled CWs to the stream index and the DRS index can be described, for example, as shown in table 1000.

As described in FIG. 4, an eNodeB may send a number of data streams to a number of UEs, and this operation is called multi-user MIMO (MU-MIMO) operation. In one transmission mode, the eNodeB is able to transmit up to two streams in a time-frequency resource, and up to two UEs may receive at least one stream each in the time-frequency resource. In another transmission mode, the eNodeB is able to transmit up to four streams in a time-frequency resource, and up to four UEs may receive at least one stream each in the time-frequency resource.

FIG. 11 illustrates a table 1100 showing a mapping of a new data indicator (NDI) bit of a disabled codeword to a stream index and a dedicated reference signal (DRS) index according to an embodiment of this disclosure.

As shown in FIG. 11, the stream (and the DRS) index is indicated using an NDI bit for a disabled CW in a DCI format, and the mapping of the NDI bit of a disabled CW to the stream index and the DRS index can be described, for example, as shown in table 1100.

Several scrambling sequence generation and mapping methods have been proposed for multi-layer beamforming. The initialization of the RS sequence can be cell-specific, UE specific, and/or antenna-port specific. When the initialization of the DRS sequence is cell-specific [UE specific, antenna-port specific], the initialization seed can be determined as a function of the cell-id [UE id or RNTI, antenna port number].

Figure 12:
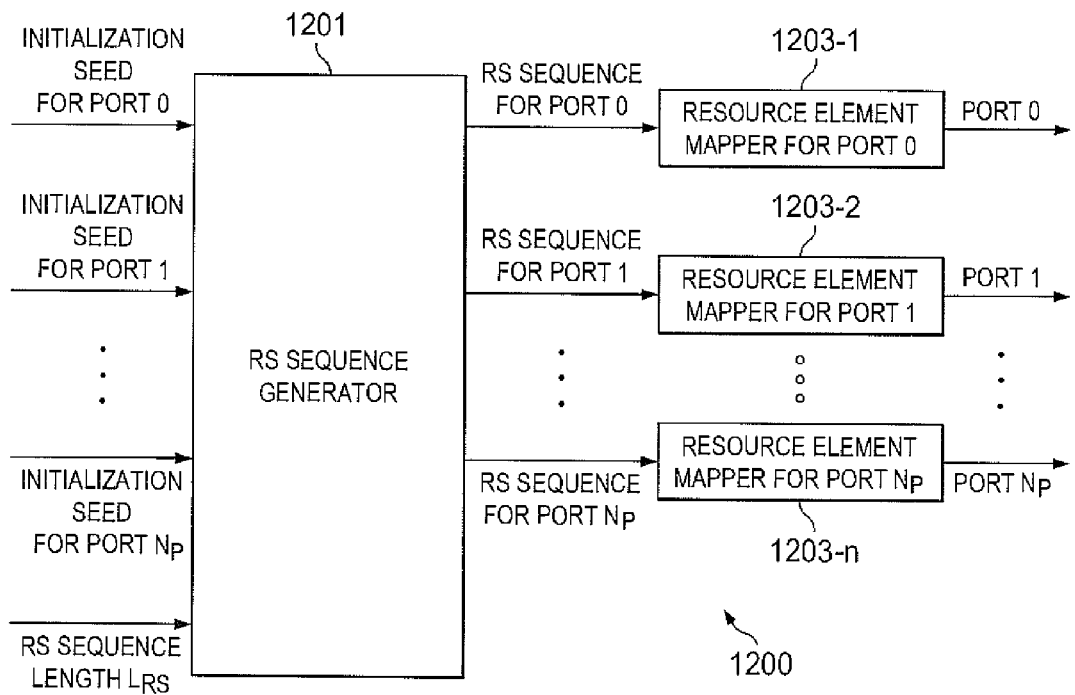
FIG. 12 illustrates a system for generating and mapping reference signal sequences according to an embodiment of this disclosure.

FIG. 12 illustrates a system 1200 for generating and mapping reference signal sequences according to an embodiment of this disclosure.

As shown in FIG. 12, system 1200 generates a plurality of RS sequences and maps the generated RS sequences onto a number of antenna ports in two steps. The generated RS sequences can be mapped onto either cell-specific antenna ports or UE-specific (or dedicated) antenna ports.

The RS sequence generator 1201 receives an initialization seed $c_{init,g}$ for generating a pseudo-random sequence $c_g(i)$. The RS sequence generator 1201 then uses the pseudo-random sequence $c_g(i)$ to generate a respective RS sequence for each of the antenna ports and sends each RS sequence to a respective resource element mapper 1203-1 to 1203-n for each of the antenna ports.

Demodulation reference signals (DMRSs) are provided for each UE's demodulation. In some cases, the DMRS can be a dedicated RS (DRS) to each UE, implying that the RS provided to one UE cannot be utilized by the other UEs scheduled in different frequency bands in the same subframe, or in adjacent subframes in the same frequency band. In the case of multi-antenna transmissions, a number of DRSs are provided for the demodulation of the number of multiple data streams, and each DRS is sometimes precoded with the same precoder used for data stream.

When multiple UEs are co-scheduled in the same frequency band, a first number of streams are transmitted to a first UE, and a second number of streams are transmitted to a second UE. The present disclosure provides two possible ways for the eNodeB to provide each UE's DRS in this multi-user MIMO transmission.

In one embodiment referred to as non-transparent MU-MIMO, the eNodeB provides orthogonal sets of DRS to the UEs, where the first and the second UEs receive the first and the second number of orthogonal DRSs. All of the first number and the second number of DRSs are orthogonally multiplexed, e.g., by FDM/TDM or CDM. Furthermore, the first UE and the second UE know that there could be other UEs co-scheduled in the same time-frequency resource.

In another embodiment referred to as transparent MU-MIMO or SU-MIMO, the eNodeB provides the first and the second number of DRSs to the first and the second UEs. In this method, the first number and the second number of DRSs may not be orthogonally multiplexed. Furthermore, the first and the second UEs may not be able to know that there could be other UEs co-scheduled in the same time-frequency resource.

In one example, two UEs, UE 0 and UE 1, are co-scheduled in the same frequency band by an eNodeB, where UE 0 would receive stream 0, while UE 1 would receive stream 1.

When non-transparent MU-MIMO is used, UE 0 would receive DRS 0 together with stream 0, while UE 1 would receive DRS 1 together with stream 1. FIG. 6 illustrates specific DRS patterns with FDM/TDM and with CDM that may be used. For example, in the FDM pattern shown in the reference signal pattern 610, UE 0 would receive its DRS in the RS REs with label 0, while UE 1 would receive its DRS in the RS REs with label 1. If UE 0 knows that another UE is co-scheduled in the time-frequency resource where it receives the downlink transmission by certain means, UE 0 may try to estimate interfering channels in the other DRS REs, i.e., the RS REs with label 1, and use the interference information for demodulation.

When transparent MU-MIMO is used, UE 0 and UE 1's DRSs are not necessarily orthogonally multiplexed, and each UE assumes that there are no co-scheduled UEs in the time-frequency resource where it receives the downlink transmission. In other words, in this MU-MIMO mode, the UEs expect SU-MIMO transmissions from the eNodeB. In one example, both UE 0 and UE 1 would receive DRS in the same set of RS REs, e.g., RS REs with label 0 in FIG. 6.

For single-user transmissions in a time-frequency resource of an eNodeB's cell, RS scrambling has been used to make the inter-cell interference independent of the desired RS signal to a UE. In each downlink transmission, a UE receives a distorted RS signal that is a superposition of the desired RS signal, the interfering RS signal from other cells, and the noise. With a cell-specific RS scrambling sequence, the inter-cell interference seen at a UE becomes independent of the desired RS signal, which facilitates the channel estimation.

In the case of multi-user transmissions, more considerations with regard to DRS scrambling to facilitate the channel and the intra-cell interference estimations are needed. There are two ways to perform DRS scrambling. In a first method, DRS 0 and DRS 1 are scrambled in a UE-specific way. In a second method, DRS 0 and DRS 1 are scrambled in a cell-specific way, as for single-user transmissions.

With regard to the first method, when non-transparent MU-MIMO is used, two UEs have two orthogonal sets of resources (DRS REs) for the two sets of DRSs. In this case, even if UE 1 knows of the RS REs for the UE 0's DRS, UE 1 may not be aware of the scrambling sequence used for the DRS for UE 0's stream since UE 1 does not know the UE id for UE 0. In such a case, UE 1 may not be able to estimate the interfering channels. On the other hand, when transparent MU-MIMO is used, two UEs may receive their DRSs in the same set of DRS REs. In the set of DRS REs, UE 1 would receive a distorted RS signal that is a superposition of the desired RS signal, the interfering RS signal intended for UE 1, and the noise. When the scrambling sequence is UE-specific, the interfering RS signal is independent of the desired RS signal to UE 1, which enables UE 1 to measure its channel separately from the interfering channel intended for, UE 0.

In the case where DRSs are scrambled using the second scrambling method and non-transparent MU-MIMO is used, two UEs would have two orthogonal sets of resources (DRS REs) for the two sets of DRSs. In this case, if UE 1 knows the RS REs for the UE 0's DRS, UE 1 would be aware of the scrambling sequence used for the DRS for UE 0's stream since the DRS is cell-specific. In such a case, UE 1 may be able to estimate the interfering channels carried in the DRS REs with label 0.

On the other hand, when transparent MU-MIMO is used, two UEs may receive their DRSs in the same set of DRS REs. In the set of DRS REs, UE 1 would receive a distorted RS signal that is a superposition of the desired RS signal, the interfering RS signal intended for UE 1, and the noise. When the scrambling sequence is cell-specific, the interfering RS signal is aligned with the desired RS signal to UE 1. In such a case, UE 1 can only measure the superimposed channel of the interfering channel and the desired channel, which could degrade the demodulation performance.

Accordingly, one scrambling method cannot universally give good channel estimation and demodulation performance in both scenarios of MU-MIMO. Accordingly, this disclosure provides a method and system to adapt the scrambling method according to the MU-MIMO modes in a wireless communication system.

In some embodiments, the UE-specific scrambling method has an initialization seed for each DRS, and the initialization seed is dependent on the UE-id or RNTI number. The initialization seed may or may not be dependent on the antenna port id or the cell-id.

In one particular embodiment, the initialization seed is determined using Equation 1 below:

$$c_{init}=(\lfloor n_s/2 \rfloor+1)\cdot(2N_{ID}^{cell}+1)\cdot 2^{16}+n_{RNTI}, \quad [\text{Eqn. 1}]$$

where $n_s$ is the slot id, $N_{ID}^{cell}$ is the cell id, and $n_{RNTI}$ is the UE-id or the radio network temporary identifier (RNTI) number.

In another particular embodiment, the initialization seed is determined using Equation 2 below:

$$c_{init}=(g+z+1)(\lfloor n_s/2 \rfloor+1)\cdot(2N_{ID}^{cell}+1)\cdot 2^{16}+n_{RNTI}, \quad [\text{Eqn. 2}]$$

where g is an antenna port number (e.g., 0 or 1 when there are two antenna ports) and z is an integer (e.g., 0 or 1).

In yet another particular embodiment, the initialization seed is determined using Equation 3 below:

$$c_{init}=(\lfloor n_s/2 \rfloor+g+z+1)\cdot(2N_{ID}^{cell}+1)\cdot 2^{16}+n_{RNTI}, \quad [\text{Eqn. 3}]$$

where g is an antenna port number.

In other embodiments, the cell-specific scrambling method has an initialization seed for each DRS, and the initialization seed is dependent on the cell-id. The initialization seed may or may not be dependent on the antenna port id and is not dependent the UE-id or RNTI.

In a particular embodiment, the initialization seed is determined using Equation 4 below:

$$c_{init}=(\lfloor n_s/2 \rfloor+1)\cdot(2N_{ID}^{cell}+1)\cdot 2^{16}, \quad [\text{Eqn. 4}]$$

where $n_s$ is the slot id, $N_{ID}^{cell}$ is the cell id, and $n_{RNTI}$ is the UE-id or the RNTI number.

In another particular embodiment, the initialization seed is determined using Equation 5 below:

$$c_{init}=(g+1)(\lfloor n_s/2 \rfloor+1)\cdot(2N_{ID}^{cell}+1)\cdot 2^{16}, \quad [\text{Eqn. 5}]$$

where g is an antenna port number, e.g., 0 or 1 when there are two antenna ports.

In yet another particular embodiment, the initialization seed is determined using Equation 6 below:

$$c_{init}=(\lfloor n_s/2 \rfloor+g+1)\cdot(2N_{ID}^{cell}+1)\cdot 2^{16}, \quad [\text{Eqn. 6}]$$

where g is an antenna port number.

Once the scrambling sequence is initialized, the scrambling sequences are generated, for example, according to the methods and systems described in U.S. Non-provisional patent application Ser. No. 12/749,340, filed Mar. 29, 2010, entitled "METHOD AND SYSTEM FOR MULTI-LAYER BEAMFORMING", which is hereby incorporated by reference into the present application as if fully set forth herein.

Figure 13:
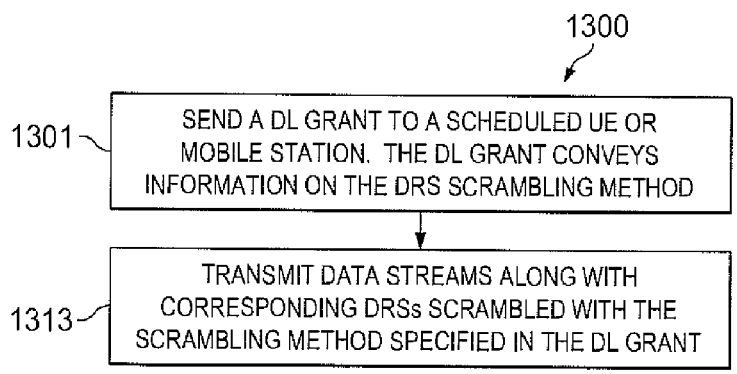
FIG. 13 illustrates a method of operating an enhanced Node B (eNodeB) or base station according to an embodiment of this disclosure.

FIG. 13 illustrates a method 1300 of operating an eNodeB or base station according to an embodiment of this disclosure.

As shown in FIG. 13, method 1300 includes sending a DL grant to a scheduled UE or mobile station. The DL grant conveys information on the DRS scrambling method (block 1301). Method 1300 also includes transmitting data streams along with corresponding DRSs scrambled with the scrambling method specified in the DL grant (block 1303).

Figures 14, 15, 16:
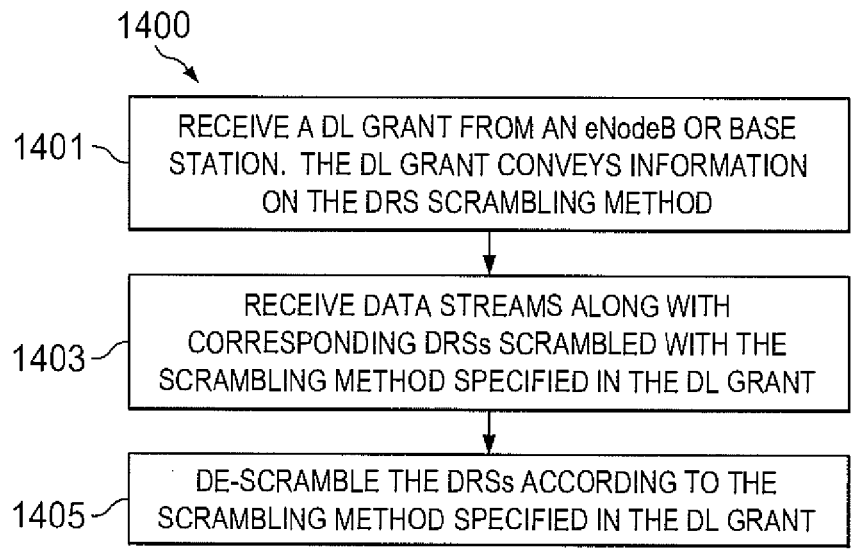
FIG. 14 illustrates a method of operating a UE or mobile station according to an embodiment of this disclosure.
FIG. 15 illustrates a table depicting two states in a downlink (DL) grant according to an embodiment of this disclosure.
FIG. 16 illustrates a table depicting two states in a downlink (DL) grant using a one-bit field according to an embodiment of this disclosure.

FIG. 14 illustrates a method 1400 of operating a UE or mobile station according to an embodiment of this disclosure.

As shown in FIG. 14, method 1400 includes receiving a DL grant from an eNodeB or base station. The DL grant conveys information on the DRS scrambling method (block 1401). Method 1400 also includes receiving data streams along with corresponding DRSs scrambled with the scrambling method specified in the DL grant (block 1403). Method 1400 further includes de-scrambling the DRSs according to the scrambling method specified in the DL grant (block 1405).

FIG. 15 illustrates a table 1500 depicting two states in a downlink (DL) grant according to an embodiment of this disclosure.

As shown in table 1500, the two choices are indicated in the DL grant as two states, where the first state indicates cell-specific scrambling of the DRS sequence and the second state indicates UE-specific scrambling of the DRS sequence.

There are many ways to construct two codepoints in the DL grant to represent these two states. In one embodiment, a one-bit field is added to the DL grant, and this one-bit field is used to indicate these two states. This embodiment applies to any DCI format that an eNodeB uses to send the DL grant to a UE.

FIG. 16 illustrates a table 1600 depicting two states in a downlink (DL) grant using a one-bit field according to an embodiment of this disclosure.

In this particular embodiment, a first value of "0" in the one-bit field indicates the first state in which cell-specific scrambling of the DRS sequence is used. A second value of "1" in the one-bit field indicates the second state in which UE-specific scrambling of the DRS sequence is used.

In an embodiment of this disclosure, the number of enabled TBs (1 or 2) in the DL grant is used to indicate the choice of cell-specific scrambling or UE-specific scrambling. This embodiment is applicable for the DCI formats that can indicate two TBs, for example, the 2A' DCI format mentioned above (which is based on 2A). For the case when the DCI format only supports 1 TB, then the choice of scrambling method is dependent on the transmission scheme. For example, if transmit diversity is used, then UE-specific scrambling is adopted. If single-DRS port scheme is used, cell-specific scrambling is adopted.

FIG. 17 illustrates a table 1700 summarizing the indication of the DRS scrambling method as a function of the DCI format, the number of enabled TBs and the transmission mode according to an embodiment of this disclosure.

DCI format 1A' in table 1700 refers to a slightly modified version of format 1A. Although Rel-8 currently only allows the combination of C-RNTI with transmit diversity, and SPS-RNTI with single DRS-port transmission scheme, in Rel-9 and beyond, the other two combinations (C-RNTI with single DRS-port, and SPS-RNTI with transmit diversity) may also be possible. For the case of DCI format 2A or 2A', the embodiments of this disclosure may be combined with any number of methods for indicating the DRS port index. For the case of DCI format 1A or 1A', the embodiments of this disclosure can be combined with semi-static indication of the DRS port index, such as radio resource control (RRC) signaling, or fixed indication of the DRS port index, such as association of the DRS port index with the UE ID, etc.

Figures 18, 19, 22:
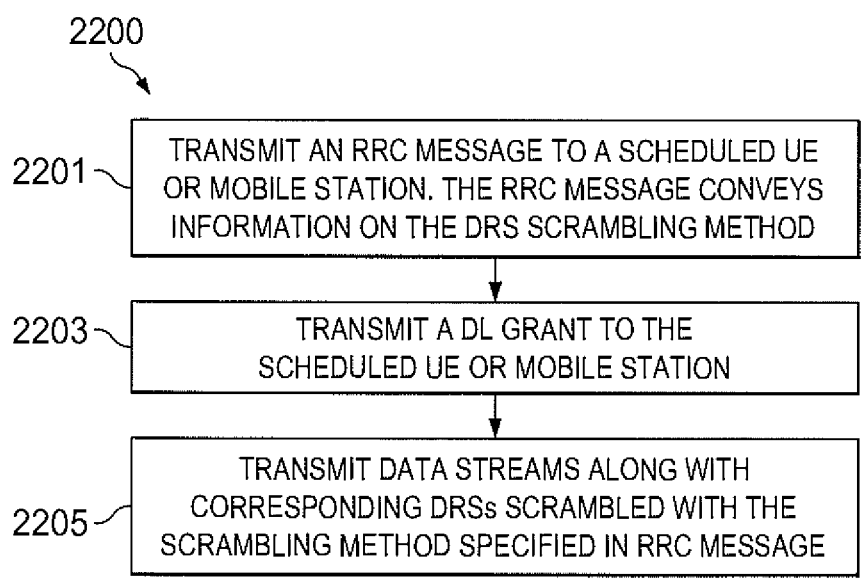
FIG. 18 illustrates a table depicting two states in a downlink (DL) grant according to another embodiment of this disclosure.
FIG. 19 illustrates a table depicting two states in a downlink (DL) grant using a one-bit field according to another embodiment of this disclosure.
FIG. 22 illustrates a method of operating an eNodeB or base station according to another embodiment of this disclosure.

FIG. 18 illustrates a table 1800 depicting two states in a downlink (DL) grant according to another embodiment of this disclosure.

In an embodiment of this disclosure, the choice of the DRS scrambling method is indicated by the eNodeB to the UE by the downlink grant as shown in FIG. 13. The two choices are indicated in the DL grant as one of two state as shown in table 1800, where the first state indicates group-specific scrambling of the DRS sequence and the second state indicates UE-specific scrambling of the DRS sequence. The group-specific scrambling is very similar to cell-specific scrambling, except that the cell-id is replace by the group id (which indicates which group the UE belongs to, where the UEs in a particular cell are divided into several groups) in the initialization step of scrambling. The group id is communicated to the user by either higher-layer UE-specific RRC signaling or secondary broadcast system information block (SIB) signaling.

In one example, the initialization seed is determined using Equation 7 below:

$$c_{init}=(\lfloor n_s/2 \rfloor+1) \cdot (2N_{ID}^{cell}+1) \cdot 2^{16},$$ [Eqn. 7]

where $n_s$ is the slot id, $N_{ID}^{group}$ is the group id, and $n_{RNTI}$ is the UE-id or the RNTI number.

FIG. 19 illustrates a table 1900 depicting two states in a downlink (DL) grant using a one-bit field according to another embodiment of this disclosure.

There are many ways to construct two codepoints in the DL grant to represent these two states. One codepoint construction method includes adding a one-bit field to the DL grant, and using this one-bit field to indicate these two states. This method applies to any DCI format that an eNodeB uses to send a DL grant to a UE. A particular embodiment of this method is illustrated in table 1900.

FIG. 20 illustrates a table 2000 summarizing the indication of the DRS scrambling method as a function of the DCI format, the number of enabled TBs and the transmission mode according to another embodiment of this disclosure.

In an embodiment of this disclosure, the number of enabled TBs (1 or 2) in the DL grant is used to indicate the choice of either group-specific scrambling or UE-specific scrambling. This is applicable for the DCI formats that can indicate two TBs, for example, the 2A' DCI format mentioned above (which is based on 2A). For the case where the DCI format only supports 1 TB, the choice of scrambling method is dependent on the transmission scheme. For example, if transmit diversity is used, then UE-specific scrambling is adopted. If a single-DRS port scheme is used, then group-specific scrambling is adopted.

DCI format 1A' in table 2000 refers to a slightly modified version of format 1A. Although Rel-8 currently only allows the combination of C-RNTI with transmit diversity, and SPS-RNTI with single DRS-port transmission scheme, in Rel-9 and beyond, the other two combinations (C-RNTI with single DRS-port, and SPS-RNTI with transmit diversity) may also be possible. For the case of DCI format 2A or 2A', the embodiments of this disclosure may be combined with any number of methods for indicating the DRS port index. For the case of DCI format 1A or 1A', the embodiments of this disclosure can be combined with semi-static indication of the DRS port index, such as RRC signaling, or fixed indication of the DRS port index, such as association of the DRS port index with the UE ID, etc.

FIG. 21 illustrates a table 2100 depicting use of an existing bit in a particular downlink (DL) grant to indicate the choice of cell-specific scrambling or UE-specific scrambling according to an embodiment of this disclosure.

In one embodiment of this disclosure, an existing bit in a particular DL grant is reinterpreted to indicate these two states. This embodiment also is applicable for DCI formats that can indicate two TBs, for example, the 2A' DCI format mentioned above (which is based on 2A). This embodiment involves the following:

if both TB1 and TB2 are enabled, then UE-specific scrambling is always used (to allow transparent MU-MIMO);
if one of the TBs is disabled, then the codepoints needed to represent the two states (of the scrambling method) are obtained by reinterpreting either the NDI bit of the disabled TB or the TB to CW mapping bit (which is similar to using the two codepoints (states) of the enabled CW index (as show in table 1000)); and
if one of the TB is disabled, the same set of codepoints can also be used to indicate whether the UE should expect total rank of 1 (SU-MIMO) or 2 (MU-MIMO with each user sending rank-1).

In addition, the treatment is the same as in the above embodiment, for the case where the UE receives a DCI format that supports only 1 TB.

This embodiment in summarized in table 2100. As mentioned above, the bit to be reinterpreted could be the NDI bit of the disabled TB, the CW to TB mapping bit, or the two states associated with which CW is enabled.

Again, in this embodiment for the case of DCI format 2A or 2A', the embodiments of this disclosure may be combined with any number of methods for indicating the DRS port index. For the case of DCI format 1A or 1A', the embodiments of this disclosure can be combined with semi-static indication of the DRS port index, such as RRC signaling, or fixed indication of the DRS port index, such as association of the DRS port index with the UE ID, etc.

In another embodiment of this disclosure, the state of the DRS scrambling method is carried semi-statically in higher layer signaling, e.g., RRC signaling.

In one example, the eNodeB signals the first scrambling method to a UE when the eNodeB intends to use non-transparent MU-MIMO for the UE, and the eNodeB signals the second scrambling method to a UE when the eNodeB intends to use transparent MU-MIMO for the UE.

FIG. 22 illustrates a method 2200 of operating an eNodeB or base station according to another embodiment of this disclosure.

As shown in FIG. 22, method 2200 includes transmitting an RRC message to a scheduled UE or mobile station. The RRC message conveys information on the DRS scrambling method (block 2201). Method 1300 also includes transmitting a DL grant to the scheduled UE or mobile station (block 2203). Method 1300 further includes transmitting data streams along with corresponding DRSs scrambled with the scrambling method specified in RRC message (block 2205).

Figure 23:
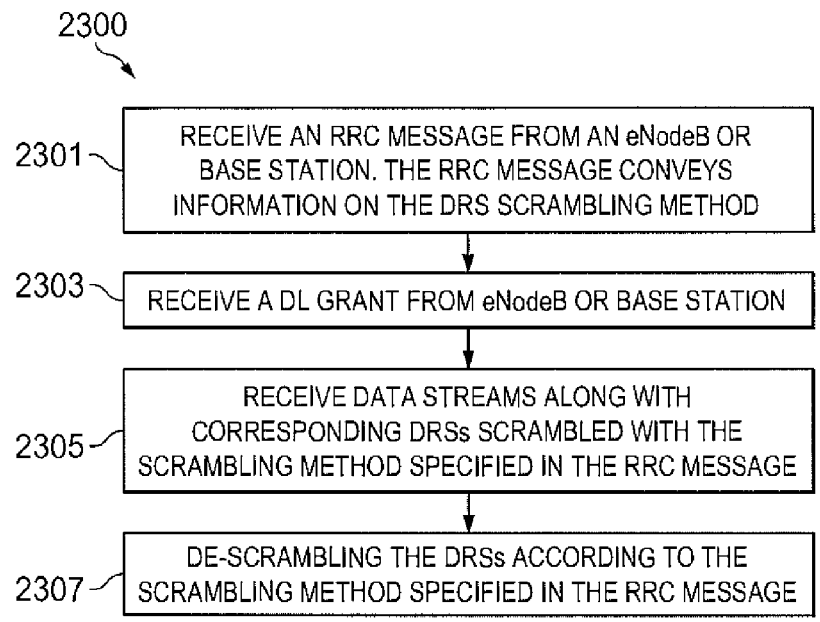
FIG. 23 illustrates a method of operating a UE or mobile station according to an embodiment of this disclosure.

FIG. 23 illustrates a method 2300 of operating a UE or mobile station according to an embodiment of this disclosure.

As shown in FIG. 23, method 2300 includes receiving an RRC message from an eNodeB or base station. The RRC message conveys information on the DRS scrambling method (block 2301). Method 2300 also includes receiving a DL grant from the eNodeB or base station (block 2303). Method 2300 further includes receiving data streams along with corresponding DRSs scrambled with the scrambling method specified in the RRC message (block 2305). Method 2300 further includes de-scrambling the DRSs according to the scrambling method specified in the RRC message (block 2307).

In another embodiment of this disclosure, the state of the DRS scrambling method is conveyed by the DCI format used for the downlink grant.

For example, for UEs in transmission mode A as summarized in table 900, two DCI formats can be transmitted, DCI format 2A and DCI format 1A. In a particular embodiment, DCI format 1A is associated with the first DRS scrambling method, and DCI format 2A is associated with the second DRS scrambling. In this case, when DCI format 1A is transmitted as a downlink grant, the eNodeB scrambles the scrambling sequence using the first DRS scrambling method 1. When DCI format 2A is transmitted as a downlink grant, the eNodeB scrambles the scrambling sequence using the second DRS scrambling method. Of course, another possible way is to associate DCI format 1A with the second DRS scrambling method and DCI format 2A with the first DRS scrambling method.

Figure 24:
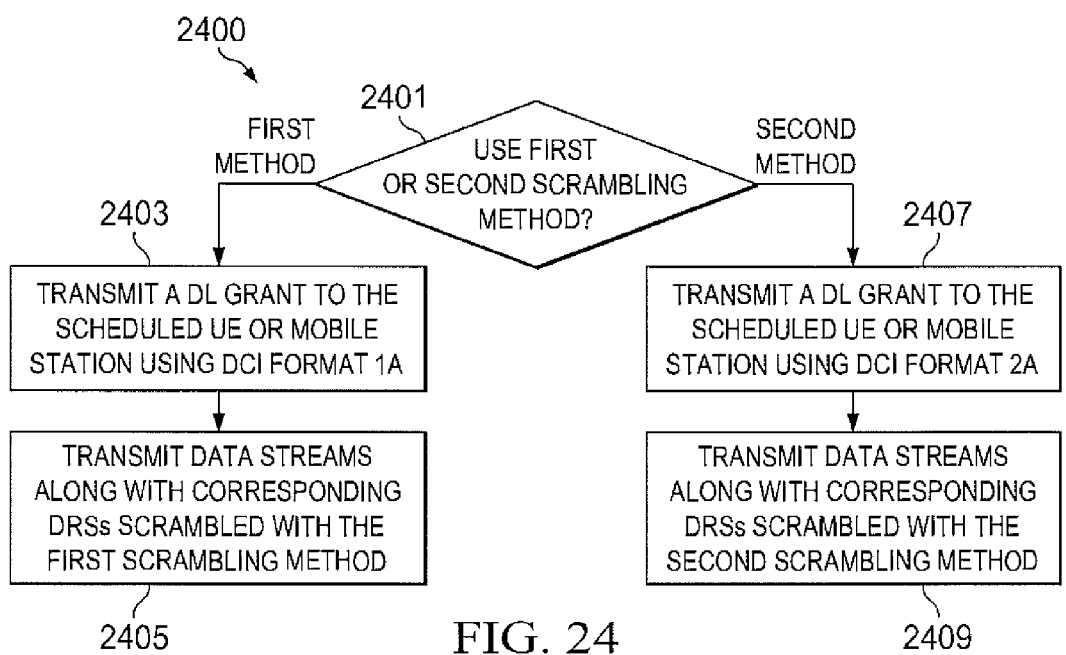
FIG. 24 illustrates a method of operating an eNodeB or base station according to a further embodiment of this disclosure.

FIG. 24 illustrates a method 2400 of operating an eNodeB or base station according to a further embodiment of this disclosure.

As shown in FIG. 24, method 2400 includes determining whether a first scrambling method or a second scrambling method is to be used for a particular UE or mobile station (block 2401). If the first scrambling method is to be used, method 2400 also includes transmitting a DL grant to the scheduled UE or mobile station using DCI format 1A (block 2403), and transmitting data streams along with corresponding DRSs scrambled with the first scrambling method (block 2405). If the second scrambling method is to be used, method 2400 also includes transmitting a DL grant to the scheduled UE or mobile station using DCI format 2A (block 2407), and transmitting data streams along with corresponding DRSs scrambled with the second scrambling method (block 2409).

Figures 25, 26, 27:
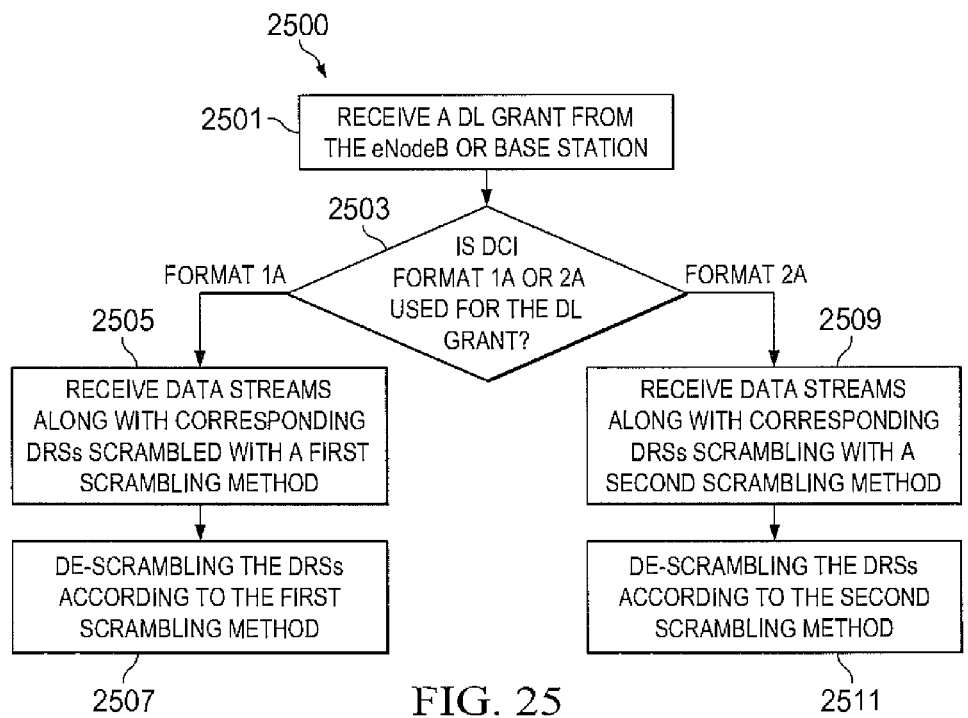
FIG. 25 illustrates a method of operating a UE or mobile station according to an embodiment of this disclosure.
FIG. 26 illustrates a table summarizing a method of indicating a group id and a stream index using the DCI format 2B according to an embodiment of this disclosure.
FIG. 27 illustrates a table summarizing a method of indicating a group id and a stream index using the DCI format 2B according to another embodiment of this disclosure.

FIG. 25 illustrates a method 2500 of operating a UE or mobile station according to an embodiment of this disclosure.

As shown in FIG. 25, method 2500 includes receiving a DL from the eNodeB or base station (block 2501). Method 2500 also includes determining whether DCI format 1A or 2A is received (block 2503). If DCI format 1A is received, method 2500 further includes receiving data streams along with corresponding DRSs scrambled with a first scrambling method (block 2505), and de-scrambling the DRSs according to the first scrambling method (block 2507). If DCI format 2A is received, method 2500 further includes receiving data streams along with corresponding DRSs scrambled with a second scrambling method (block 2509), and de-scrambling the DRSs according to the second scrambling method (block 2511).

Demodulation reference signals (DMRSs) are provided for each UE's demodulation. In some cases, the DMRS can be a dedicated RS (DRS) to each UE, implying the RS provided to one UE cannot be utilized by the other UEs scheduled in different frequency bands in the same subframe, or in adjacent subframes in the same frequency band. In the case of multi-antenna transmissions, a number of DRSs are provided for the demodulation of the number of multiple data streams, and each DRS can be precoded with the same precoder used for data stream.

From one of UE-specific RRC signaling, UE-specific dynamic signaling and broadcast signaling, UEs receive cell-id $N_{ID}^{cell}$ group and group-id $N_{ID}^{group}$ from an eNodeB. Here, the group id indicates the group of UEs to which a particular UE belongs. There can be several ways in which a group formed. For example, for a single-cell operation, a group is formed by a subset of UEs in a cell. For a coordinated multi-point (COMP) operation, a group is formed by a subset of UEs from several cells within the COMP measurement area.

The time slots are indexed by a slot number $n_s$, and a UE is aware of the slot number in each slot where the UE receives downlink signals, and where the UE transmits uplink signals.

In a subframe composed of two time slots, the eNodeB assigns a number of downlink resource blocks (RBs) to a UE, and transmits data streams and the DM RS in the assigned RBs, where one DM RS is transmitted per data steam, to the UE. The DM RS sequence for each stream can be generated, for example, following the procedure in 3GPP TS 36.211 v 8.6.0, "E-UTRA, Physical channels and modulation", March 2009, with an initialization seed of pseudo-random sequence generated from at least one of a cell-id, a group id and a slot number in a subframe. 3GPP TS 36.211 v 8.6.0, "E-UTRA, Physical channels and modulation", March 2009, is hereby incorporated by reference into the present application as if fully set forth herein.

In one embodiment of this disclosure, the initialization seed is determined using Equation 8 below:

$$c_{init}=(\lfloor n_s/2 \rfloor+1) \cdot (2N_{ID}^{cell}+1) \cdot (AN_{ID}^{group}+1)2^B+C, \quad\quad [\text{Eqn. 8}]$$

where $n_s$ is the first slot number in the subframe, $N_{ID}^{cell}$ is the cell id, $N_{ID}^{group}$ is the group id, and A, B, C are integers. For example, A is either 1 or 2, B is an integer less than or equal to 16, and C is an integer less than $2^B$.

In another embodiment of this disclosure, the initialization seed is determined using Equation 9 below:

$$c_{init}=(\lfloor n_s/2 \rfloor+1) \cdot (2N_{ID}^{cell}+AN_{ID}^{group}+1) \cdot 2^B+C, \quad\quad [\text{Eqn. 9}]$$

where $n_s$ is the first slot number in the subframe, $N_{ID}^{cell}$ is the cell id, $N_{ID}^{group}$ is the group id, and A, B, C are integers. For example, A is either 1 or 2, B is an integer less than or equal to 16, and C is an integer less than $2^B$.

In a further embodiment of this embodiment, the initialization seed is determined using Equation 10 below:

$$c_{init}=(\lfloor n_s/2 \rfloor+1) \cdot (2N_{ID}^{cell}+1) \cdot 2^B+N_{ID}^{group}, \quad\quad [\text{Eqn. 10}]$$

where $n_s$ is the first slot number in the subframe, $N_{ID}^{cell}$ is the cell id, $N_{ID}^{group}$ is the group id, and B is an integer. For example, B is an integer less than or equal to 16, and $NH_{ID}^{group}$ is an integer less than $2^B$.

In one embodiment of the current invention, a one-bit group id, i.e., either 0 or 1, is dynamically indicated to a UE via a codepoint in a DL grant sent by the eNodeB.

When format 2B is used for the DL grant, at least one of the following codepoints has been defined in format 2A for use as a one-bit group id indication: the transport block to codeword (TB-to-CW) swap bit and the NDI bit of a disabled TB. One of the other codepoints that is not used for the one-bit group id indication can be used for stream index indication.

FIG. 26 illustrates a table 2600 summarizing a method of indicating a group id and a stream index using the DCI format 2B according to an embodiment of this disclosure.

As shown in table 2600, in an embodiment of this disclosure, the TB-to-CW swap bit carries the one-bit group id, and the NDI bit of the disabled TB is used for indicating the stream index.

FIG. 27 illustrates a table 2700 summarizing a method of indicating a group id and a stream index using the DCI format 2B according to another embodiment of this disclosure.

As shown in table 2700, in an embodiment of this disclosure, the TB-to-CW swap bit carries the stream index, and the NDI bit of the disabled TB is used for indicating the group id.

Figure 28:
FIG. 28 illustrates a table summarizing a method of indicating a group id and a stream index using the DCI format 1E according to an embodiment of this disclosure.

FIG. 28 illustrates a table 2800 summarizing a method of indicating a group id and a stream index using the DCI format 1E according to an embodiment of this disclosure.

When format 1E is used for DL grant, at least one of the following codepoints has been defined in format 1A for use as a one-bit group id indication: localized/distributed VRB assignment flag, flag for formatO/formatlA differentiation, and the most significant bit of the TPC command for PUCCH. One of the other codepoints that is not used for the one-bit group id indication can be used for stream index indication.

As shown in table 2800, in an embodiment of this disclosure, the localized/distributed VRB assignment flag bit carries the one-bit group id, and the most significant bit of the TPC command is used for indicating the stream index.

Figure 29:
FIG. 29 illustrates a table summarizing a method of indicating a group id and a stream index using the DCI format 1E according to another embodiment of this disclosure.

FIG. 29 illustrates a table 2900 summarizing a method of indicating a group id and a stream index using the DCI format 1E according to another embodiment of this disclosure.

As shown in table 2900, in an embodiment of this disclosure, the most significant bit of the TPC command carries the one-bit group id, and the localized/distributed VRB assignment flag bit is used for indicating the stream index.

Figure 30:
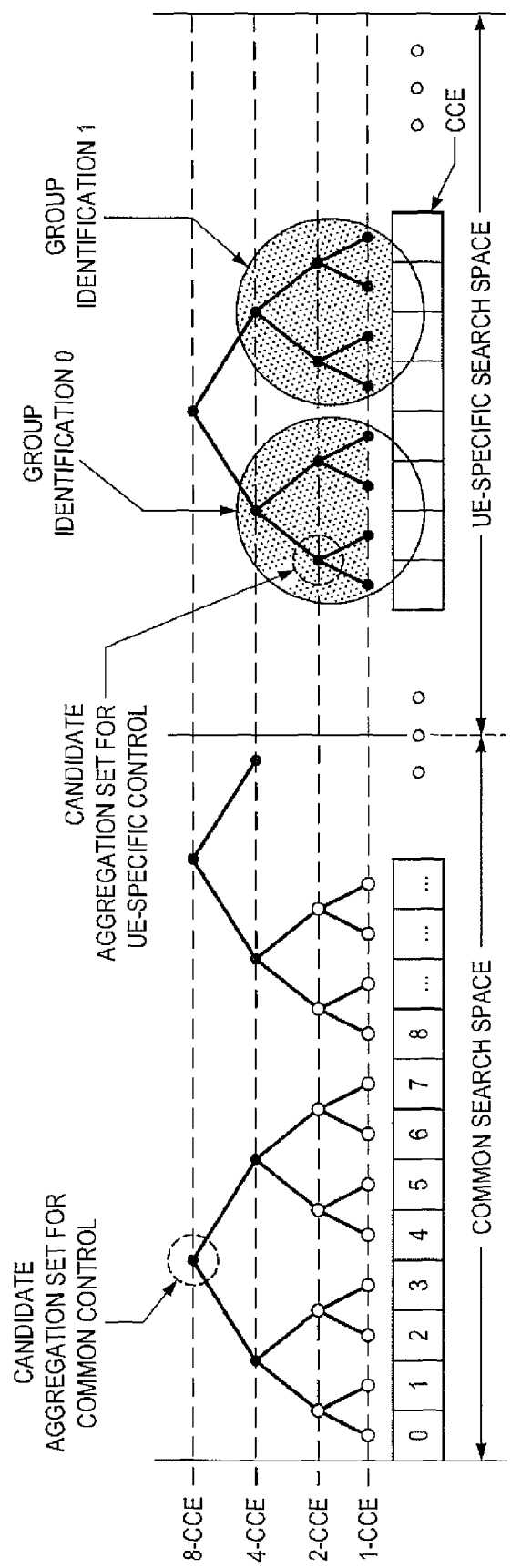
FIG. 30 illustrates a linkage between a location of a control channel element (CCE) aggregation and a group id according to an embodiment of this disclosure.

FIG. 30 illustrates a linkage between a location of a control channel element (CCE) aggregation and a group id according to an embodiment of this disclosure.

In an embodiment of this disclosure, the group id is dynamically indicated to a UE by at least one of the following information related to a DL grant available to both the UE and the eNodeB: CCE indices that carry the DL grant, the UE id number, and the relative position of the CCEs that carry the DL grant in the tree diagram. In this embodiment, the DL grant can be any of the DCI formats used as DL grants within a transmission mode, including at least format 1E and format 2B.

In one example, one of the CCE indices that carry a DL grant for a UE determines the group id of the UE. In another example, if the smallest CCE index that carries a DL grant is even, group id 0 is indicated. Otherwise, group id 1 is indicated. In a further example, if CCEs carrying a DL grant are in the left hand side of the CCE tree, group id 0 is indicated. If CCEs carrying the DL grant are in the right hand side of the CCE tree, group id 1 is indicated.

In another example, if a UE id is even, group id 0 is indicated. Otherwise, group id 1 is indicated.

In another embodiment of this disclosure, the group id is semi-statically indicated to a UE by at least one of the following of higher layer signaling methods: UE-specific RRC signaling and broadcast signaling.

Figure 31:
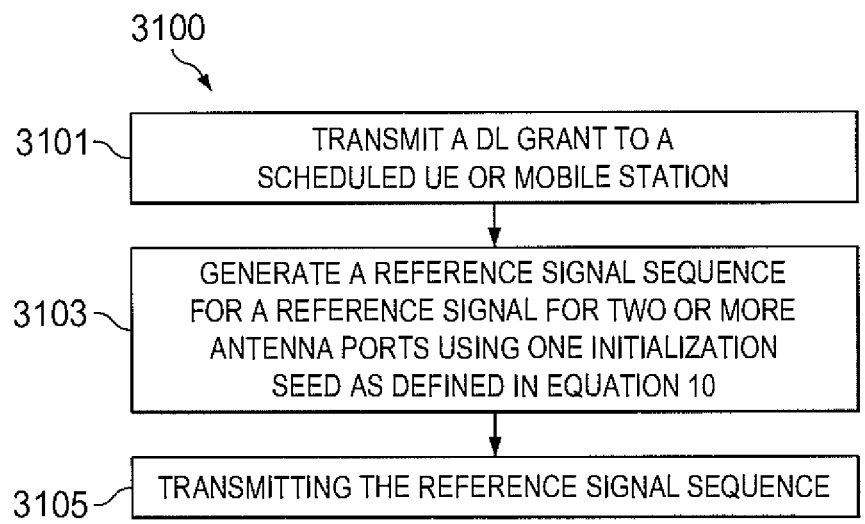
FIG. 31 illustrates a method of operating an eNodeB or base station according to yet another embodiment of this disclosure.

FIG. 31 illustrates a method 3100 of operating an eNodeB or base station according to yet another embodiment of this disclosure.

Method 3100 includes transmitting a downlink grant to a scheduled UE or mobile station (block 3103). Method 3100 also includes generating a reference signal sequence for a reference signal for two or more antenna ports using one initialization seed $c_{init}$ defined as follows:

$$c_{init}=(\lfloor n_s/2 \rfloor+1)\cdot(2N_{ID}^{cell}+1)\cdot 2^{16}+N_{ID}^{group},$$

where $n_s$ is a first slot number in a subframe, $N_{ID}^{cell}$ is a cell identifier of the base station, and $N_{ID}^{group}$ is a group (block 3103). In a particular embodiment, the $N_{ID}^{group}$ is a one-bit group identifier dynamically indicated in a codepoint in the downlink grant. Method 3100 further includes transmitting the reference signal (block 3105).

Figure 32:
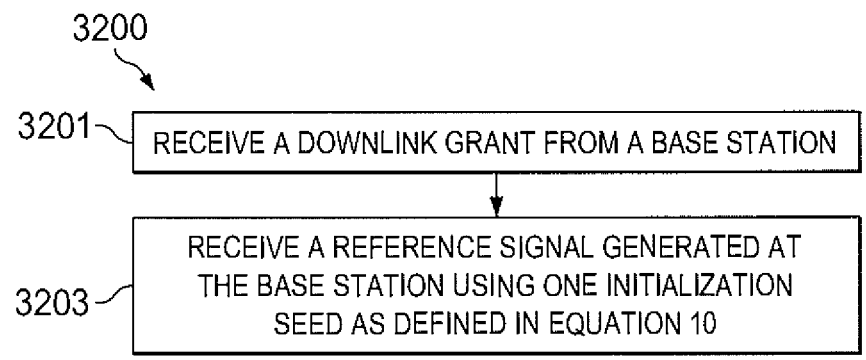
FIG. 32 illustrates a method of operating a UE or mobile station according to yet another embodiment of this disclosure.

FIG. 32 illustrates a method 3200 of operating a UE or mobile station according to yet another embodiment of this disclosure.

Method 3200 includes receiving a downlink grant from a base station (3201), and receiving a reference signal generated at the base station using one initialization seed $c_{init}$ defined as follows:

$$c_{init}=(\lfloor n_s/2 \rfloor+1)\cdot(2N_{ID}^{cell}+1)\cdot 2^{16}+N_{ID}^{group},$$

where $n_s$ is a first slot number in a subframe, $N_{ID}^{cell}$ is a cell identifier of the base station, and $N_{ID}^{group}$ is a group identifier (block 3203). In a particular embodiment, the $N_{ID}^{group}$ is a one-bit group identifier dynamically indicated in a codepoint in the downlink grant.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. A base station comprising:
a reference signal sequence generator configured to generate a reference signal sequence for a reference signal for each of n antenna ports using one initialization seed $c_{init}$, n being a positive integer,
wherein the initialization seed is defined as:

$$c_{init}=(\lfloor n_s/2 \rfloor+1)\cdot(2N_{ID}^{cell}+1)\cdot 2^{16}+N_{ID}^{group},$$

where $n_s$ is a first slot number in a subframe, $N_{ID}^{cell}$ is a cell identifier of the base station, and $N_{ID}^{group}$ is a group identifier; and
a transmit path circuitry configured to transmit a downlink grant and the reference signal.

2. The base station in accordance with claim 1 wherein the group identifier $N_{ID}^{group}$ is a one-bit group identifier dynamically indicated in a codepoint in the downlink grant transmitted by the base station.

3. The base station in accordance with claim 2 wherein the codepoint indicating the one-bit group identifier $N_{ID}^{group}$ is one of the following codepoints defined in DCI format 2A: a transport block to codeword (TB-to-CW) swap bit and a new data indicator (NDI) bit of a disabled transport block (TB), and
wherein the other of the codepoints defined DCI format 2A that is not used to indicate the one-bit group identifier $N_{ID}^{group}$ is used to indicate a stream index.

4. The base station in accordance with claim 2 wherein the one-bit group identifier $N_{ID}^{group}$ is indicated by a transport block to codeword (TB-to-CW) swap bit defined in DCI format 2A, and a stream index is indicated by a new data indicator (NDI) bit of a disabled transport block (TB) defined in DCI format 2A.

5. The base station in accordance with claim 2 wherein the one-bit group identifier $N_{ID}^{group}$ and a stream index are indicated by a transport block to codeword (TB-to-CW) swap bit and a new data indicator (NDI) bit of a disabled transport block (TB) defined in DCI format 2A as follows:

| Reinterpreted TB-to-CW swap bit | Reinterpreted NDI bit of the disabled TB | (group id, stream id) |
| --- | --- | --- |
| 0 | 0 | (0, 0) |
| 0 | 1 | (0, 1) |
| 1 | 0 | (1, 0) |
| 1 | 1 | (1, 1) |

6. A method of operating a base station, the method comprising:
generating, at a reference signal sequence generator, a reference signal sequence for a reference signal for each of n antenna ports using one initialization seed $c_{init}$, n being a positive integer,
wherein the initialization seed is defined as:

$$c_{init}=(\lfloor n_s/2 \rfloor+1)\cdot(2N_{ID}^{cell}+1)\cdot 2^{16}+N_{ID}^{group},$$

where $n_s$ is a first slot number in a subframe, $N_{ID}^{cell}$ is a cell identifier of the base station, and $N_{ID}^{group}$ is a group identifier; and
transmitting a downlink grant and the reference signal.

7. The method in accordance with claim 6 wherein the group identifier $N_{ID}^{group}$ is a one-bit group identifier dynamically indicated in a codepoint in the downlink grant transmitted by the base station.

8. The method in accordance with claim 7 wherein the codepoint indicating the one-bit group identifier $N_{ID}^{group}$ is one of the following codepoints defined in DCI format 2A: a transport block to codeword (TB-to-CW) swap bit and a new data indicator (NDI) bit of a disabled transport block (TB), and
wherein the other of the codepoints defined DCI format 2A that is not used to indicate the one-bit group identifier $N_{ID}^{group}$ is used indicate a stream index.

9. The method in accordance with claim 7 wherein the one-bit group identifier $N_{ID}^{group}$ is indicated by a transport block to codeword (TB-to-CW) swap bit defined in DCI format 2A, and a stream index is indicated by a new data indicator (NDI) bit of a disabled transport block (TB) defined in DCI format 2A.

10. The method in accordance with claim 7 wherein the one-bit group identifier $N_{ID}^{group}$ and a stream index are indicated by a transport block to codeword (TB-to-CW) swap bit and a new data indicator (NDI) bit of a disabled transport block (TB) defined in DCI format 2A as follows:

| Reinterpreted TB-to-CW swap bit | Reinterpreted NDI bit of the disabled TB | (group id, stream id) |
|---|---|---|
| 0 | 0 | (0, 0) |
| 0 | 1 | (0, 1) |
| 1 | 0 | (1, 0) |
| 1 | 1 | (1, 1) |

11. A subscriber station comprising:
a receive path circuitry configured to:
receive a downlink grant from a base station; and
receive a reference signal generated at the base station using one initialization seed $c_{init}$,
wherein the initialization seed is defined as:

$$c_{init}=(\lfloor n_s/2 \rfloor+1)\cdot(2N_{ID}^{cell}+1)\cdot 2^{16}+N_{ID}^{group},$$

where $n_s$ is a first slot number in a subframe, $N_{ID}^{cell}$ is a cell identifier of the base station, and $N_{ID}^{cell}$ is a identifier.

12. The subscriber station in accordance with claim 11 wherein the group identifier $N_{ID}^{group}$ is a one-bit group identifier dynamically indicated in a codepoint in the downlink grant.

13. The subscriber station in accordance with claim 12 wherein the codepoint indicating the one-bit group identifier $N_{ID}^{group}$ is one of the following codepoints defined in DCI format 2A: a transport block to codeword (TB-to-CW) swap bit and a new data indicator (NDI) bit of a disabled transport block (TB), and
wherein the other of the codepoints defined DCI format 2A that is not used to indicate the one-bit group identifier $N_{ID}^{group}$ is used to indicate a stream index.

14. The subscriber station in accordance with claim 12 wherein the one-bit group identifier $N_{ID}^{group}$ is indicated by a transport block to codeword (TB-to-CW) swap bit defined in DCI format 2A, and a stream index is indicated by a new data indicator (NDI) bit of a disabled transport block (TB) defined in DCI format 2A.

15. The subscriber station in accordance with claim 12 wherein the one-bit group identifier $N_{ID}^{group}$ and a stream index are indicated by a transport block to codeword (TB-to-CW) swap bit and a new data indicator (NDI) bit of a disabled transport block (TB) defined in DCI format 2A as follows:

| Reinterpreted TB-to-CW swap bit | Reinterpreted NDI bit of the disabled TB | (group id, stream id) |
|---|---|---|
| 0 | 0 | (0, 0) |
| 0 | 1 | (0, 1) |
| 1 | 0 | (1, 0) |
| 1 | 1 | (1, 1) |

16. A method of operating a subscriber station, the method comprising:
receiving a downlink grant from a base station; and
receiving a reference signal generated at the base station using one initialization seed $c_{init}$,
wherein the initialization seed is defined as:

$$c_{init}=(\lfloor n_s/2 \rfloor+1)\cdot(2N_{ID}^{cell}+1)\cdot 2^{16}+N_{ID}^{group},$$

where $n_s$ is a first slot number in a subframe, $N_{ID}^{cell}$ is a cell identifier of the base station, and $N_{ID}^{group}$ is a group identifier.

17. The method in accordance with claim 16 wherein the group identifier $N_{ID}^{group}$ is a one-bit group identifier dynamically indicated in a codepoint in the downlink grant.

18. The method in accordance with claim 17 wherein the codepoint indicating the one-bit group identifier $N_{ID}^{group}$ is one of the following codepoints defined in DCI format 2A: a transport block to codeword (TB-to-CW) swap bit and a new data indicator (NDI) bit of a disabled transport block (TB), and
wherein the other of the codepoints defined DCI format 2A that is not used to indicate the one-bit group identifier $N_{ID}^{group}$ is used to indicate a stream index.

19. The method in accordance with claim 17 wherein the one-bit group identifier $N_{ID}^{group}$ is indicated by a transport block to codeword (TB-to-CW) swap bit defined in DCI format 2A, and a stream index is indicated by a new data indicator (NDI) bit of a disabled transport block (TB) defined in DCI format 2A.

20. The method in accordance with claim 17 wherein the one-bit group identifier $N_{ID}^{group}$ and a stream index are indicated by a transport block to codeword (TB-to-CW) swap bit and a new data indicator (NDI) bit of a disabled transport block (TB) defined in DCI format 2A as follows:

| Reinterpreted TB-to-CW swap bit | Reinterpreted NDI bit of the disabled TB | (group id, stream id) |
|---|---|---|
| 0 | 0 | (0, 0) |
| 0 | 1 | (0, 1) |
| 1 | 0 | (1, 0) |
| 1 | 1 | (1, 1) |

\* \* \* \* \*